United States Patent
Miller et al.

(10) Patent No.: US 12,074,284 B2
(45) Date of Patent: Aug. 27, 2024

(54) SOLID STATE BATTERY CELL HAVING A COMPOSITE SOLID ELECTROLYTE INCLUDING LITHIUM IRON PHOSPHATE

(71) Applicant: University of Utah Research Foundation, Salt Lake City, UT (US)

(72) Inventors: Jan D. Miller, Salt Lake City, UT (US); Xuming Wang, Salt Lake City, UT (US); Qinyu Zhu, Salt Lake City, UT (US)

(73) Assignee: University of Utah Research Foundation, Salt Lake City, UT (US)

(*) Notice: Subject to any disclaimer, the term of this patent is extended or adjusted under 35 U.S.C. 154(b) by 849 days.

(21) Appl. No.: 17/055,715

(22) PCT Filed: May 21, 2019

(86) PCT No.: PCT/US2019/033351
§ 371 (c)(1),
(2) Date: Nov. 16, 2020

(87) PCT Pub. No.: WO2019/226674
PCT Pub. Date: Nov. 28, 2019

(65) Prior Publication Data
US 2021/0210782 A1 Jul. 8, 2021

Related U.S. Application Data

(60) Provisional application No. 62/674,423, filed on May 21, 2018.

(51) Int. Cl.
*H01M 10/0565* (2010.01)
*H01M 4/38* (2006.01)
(Continued)

(52) U.S. Cl.
CPC ....... *H01M 10/0565* (2013.01); *H01M 4/382* (2013.01); *H01M 4/5825* (2013.01);
(Continued)

(58) Field of Classification Search
CPC ............ H01M 10/0565; H01M 4/382; H01M 4/5825; H01M 4/625; H01M 10/0525
See application file for complete search history.

(56) References Cited

U.S. PATENT DOCUMENTS

| | | |
|---|---|---|
| 6,143,216 A | 11/2000 | Loch et al. |
| 8,334,070 B2 | 12/2012 | Ryu et al. |

(Continued)

FOREIGN PATENT DOCUMENTS

| | | |
|---|---|---|
| CN | 105932235 | 9/2016 |
| JP | 2014/032776 | 2/2014 |

(Continued)

OTHER PUBLICATIONS

Lin et al.; "Natural Halloysite Nano-Clay Electrolyte for Advanced All-Solid-State Lithium-Sulfur Batteries." Nano Energy, vol. 31, Jan. 2017; pp. 478-485.

(Continued)

*Primary Examiner* — Michael Jung
(74) *Attorney, Agent, or Firm* — Thorpe North & Western, LLP

(57) ABSTRACT

A composite solid electrolyte (410) for lithium batteries can include a solid polymer (440), a lithium salt (450) distributed in the solid polymer (440), and lithium iron phosphate (460) distributed in the solid polymer (440). A solid state lithium battery cell (400) can include a composite solid electrolyte layer (410), an anode (420) containing lithium in contact with a first surface of the composite solid electrolyte layer (410): and a cathode (430) in contact with a second surface of the composite solid electrolyte layer (410). The (Continued)

composite solid electrolyte layer (410) can include a solid polymer (440), a lithium salt (450) distributed in the solid polymer (440), and lithium iron phosphate (460) distributed in the solid polymer (440).

25 Claims, 17 Drawing Sheets

(51) Int. Cl.
H01M 4/58 (2010.01)
H01M 4/62 (2006.01)
H01M 10/0525 (2010.01)
H01M 4/02 (2006.01)

(52) U.S. Cl.
CPC ....... H01M 4/625 (2013.01); H01M 10/0525 (2013.01); H01M 2004/027 (2013.01); H01M 2004/028 (2013.01); H01M 2220/20 (2013.01); H01M 2300/0082 (2013.01); H01M 2300/0091 (2013.01)

(56) References Cited

U.S. PATENT DOCUMENTS

| | | |
|---|---|---|
| 10,044,060 B1 | 8/2018 | Young |
| 2003/0143467 A1 | 7/2003 | Riley et al. |
| 2005/0274000 A1 | 12/2005 | Oh et al. |
| 2012/0237838 A1 | 9/2012 | Uesaka |
| 2013/0011733 A1 | 1/2013 | Chang et al. |
| 2013/0189592 A1 | 7/2013 | Roumi et al. |
| 2014/0197799 A1 | 7/2014 | Leblanc et al. |
| 2015/0099185 A1 | 4/2015 | Joo et al. |
| 2015/0372290 A1* | 12/2015 | Li ................... H01M 4/386 429/188 |
| 2016/0013463 A1* | 1/2016 | Roumi ............... H01M 10/48 429/145 |
| 2016/0064785 A1 | 3/2016 | Kim et al. |
| 2016/0079641 A1 | 3/2016 | Kim et al. |
| 2016/0248100 A1 | 8/2016 | Joo et al. |
| 2016/0254567 A1* | 9/2016 | Cai ................. H01M 10/0564 429/306 |
| 2016/0322685 A1 | 11/2016 | Choi |
| 2016/0344079 A1 | 11/2016 | Kim et al. |
| 2018/0166680 A1* | 6/2018 | Ophir ................ H01M 4/366 |
| 2018/0198169 A1* | 7/2018 | Fukui ............... H01M 10/0436 |

FOREIGN PATENT DOCUMENTS

| | | |
|---|---|---|
| WO | WO 2008/007814 A1 | 1/2008 |
| WO | WO 2015/084945 A1 | 6/2015 |
| WO | WO 2016/196873 A1 | 12/2016 |

OTHER PUBLICATIONS

Ma et al.; "Effect of montmorillonite on the ionic conductivity and electrochemical properties of a composite solid polymer electrolyte based on polyvinylidenedifluroide/polyvinyl alcohol matrix for lithium ion batteries." vol. 187, Jan. 1, 2016; pp. 535-542.

PCT Application No. PCT/US19/33351 Filing date May 21, 2019, Jan Miller, International Search Report Mailing date Sep. 5, 2019, 9 Pages.

* cited by examiner

SOLID STATE BATTERY CELL HAVING A COMPOSITE SOLID ELECTROLYTE INCLUDING LITHIUM IRON PHOSPHATE

RELATED APPLICATION

This application claims priority to U.S. Provisional Application No. 62/674,423 filed May 21, 2018, which is incorporated herein by reference.

FIELD OF THE INVENTION

The present technology relates to lithium batteries and electrolytes that can be used in lithium batteries.

BACKGROUND

Lithium ion (Li-ion) battery technology has been applied in portable electronic devices for many years. More recently, Li-ion batteries have been used in transportation systems such as hybrid and electric vehicles. These markets present different challenges in battery cell design, the former requiring generally higher power density, and the latter requiring higher energy density for greater degrees of vehicle electrification. However, the need for improved conductivity and diffusivity are common to both markets. Conventional liquid or gel electrolytes can provide satisfactory performance. Liquid and gel electrolytes can also provide good contact with electrodes and accommodate volume changes in the electrodes during charging and discharging of the battery. However, solvent leakage and flammability of conventional liquid electrolytes create safety and reliability concerns. Accordingly, research continues in the area of Li-ion batteries.

SUMMARY

The present disclosure is drawn to composite solid electrolytes for lithium batteries and batteries that include the solid composite electrolytes. In one example, a composite solid electrolyte can include a solid polymer, a lithium salt distributed in the solid polymer, and lithium iron phosphate distributed in the solid polymer. In certain examples, the lithium iron phosphate can be present in an amount from 0.5 wt % to 2 wt %. In other examples, the solid polymer can include one or more of polyethylene oxide, polymethyl methacrylate, polycarbonate, polysiloxane, starch, sugar, fiber, polyvinyl alcohol, polyphosphazene and polystyrene. In further examples, a molar ratio of ethylene oxide units to lithium ions (EO:Li) in the composite solid electrolyte can be from 8:1 to 25:1.

In certain examples, the composite solid electrolyte can be formed as a thin film having a thickness from 1 μm to 300 μm. In other examples, the thickness can be from 10 μm to 100 μm. In further examples, the composite solid electrolyte can have a lithium ion conductivity of at least $10^{-4}$ S cm$^{-1}$ at 25° C. In certain examples, the lithium salt distributed in the solid polymer can be LiTFSI, although other lithium salts such as, but not limited to, LiPF$_6$, LiBF$_4$, and the like may be used.

In further examples, the composite solid electrolyte can also include phyllosilicate nanoparticles distributed in the solid polymer. In some examples, the phyllosilicate nanoparticles can be in the form of nanotubes, nanoplatelets, or a combination thereof. In other examples, the phyllosilicate nanoparticles can include an aluminum based phyllosilicate, a magnesium based phyllosilicate, or a combination thereof.

In still other examples, the phyllosilicate nanoparticles can include one or more of kaolinite, halloysite, chrysotile, antigorite, talc, pyrophyllite, montmorillonite, chlorite, mica, sepiolite, and serpentine. In some specific examples, the phyllosilicate nanoparticles can be bilayer phyllosilicates. In certain examples, the bilayer phyllosilicate nanoparticles can include one or more of halloysite, kaolinite, chrysotile, and antigorite.

In further examples, the phyllosilicate nanoparticles can be chemically modified with a lithium ion. In still further examples, the phyllosilicate nanoparticles can be functionalized by one or more of carbonate, ethylene oxide, and phosphazene. In other examples, the phyllosilicate nanoparticles can be in the form of nanotubes having a liquid polymer electrolyte impregnated in an interior volume of the nanotubes. In certain examples, the phyllosilicate nanoparticles can be bilayer halloysite nanotubes. In further examples, the phyllosilicate nanoparticles can be present in an amount from 1 wt % to 30 wt %.

In another example, a solid state lithium battery cell can include a composite solid electrolyte layer, an anode containing lithium in contact with a first surface of the composite solid electrolyte layer, and a cathode in contact with a second surface of the composite solid electrolyte layer. The composite solid electrolyte layer can include a solid polymer, a lithium salt distributed in the solid polymer, and lithium iron phosphate distributed in the solid polymer. In certain examples, the cathode can include lithium iron phosphate and the anode can include lithium metal. In further examples, the cathode can also include conductive carbon. In still further examples, an interfacial resistance of the cell can be from 8 kΩ to 80 kΩ and in some cases 10 kΩ to 20 kΩ. In other examples, the composite solid electrolyte layer can include phyllosilicate nanoparticles distributed in the solid polymer. In still further examples, the solid polymer can include polyethylene oxide and the phyllosilicate nanoparticles can be halloysite nanotubes. In yet further examples, the phyllosilicate nanoparticles can be bilayer phyllosilicates.

Additional features and advantages of these principles will be apparent from the following detailed description, which illustrates, by way of example, features of the invention.

Figure 1:
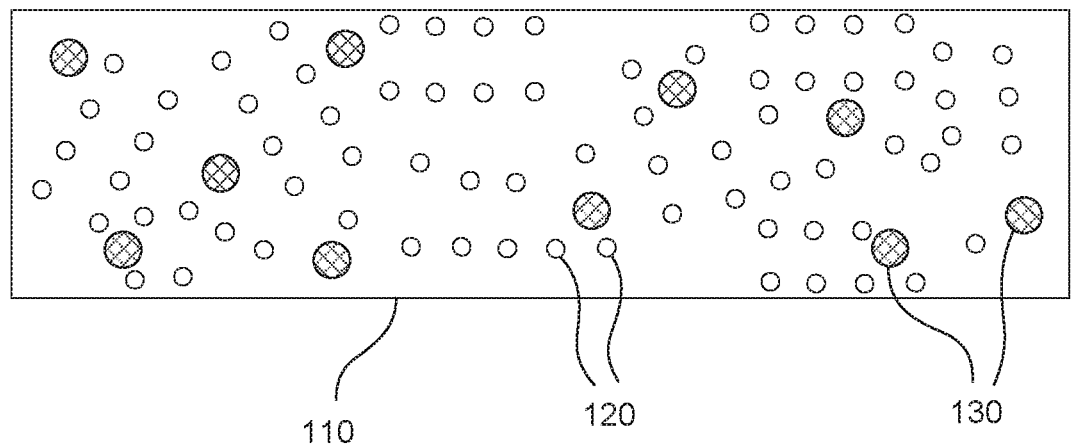
FIG. 1 is a schematic cross sectional view of an example composite solid electrolyte in accordance with an example of the present disclosure.

These drawings are provided to illustrate various aspects of the invention and are not intended to be limiting of the scope in terms of dimensions, materials, configurations, arrangements or proportions unless otherwise limited by the claims.

DETAILED DESCRIPTION

Reference will now be made to exemplary embodiments and specific language will be used herein to describe the same. It will nevertheless be understood that no limitation of the scope of the invention is thereby intended. Alterations and further modifications of the inventive features described herein, and additional applications of the principles of the invention as described herein, are to be considered within the scope of the invention. Further, before particular embodiments are disclosed and described, it is to be understood that this invention is not limited to the particular process and materials disclosed herein as such may vary to some degree. It is also to be understood that the terminology used herein is used for the purpose of describing particular embodiments only and is not intended to be limiting, as the scope of the present invention will be defined only by the appended claims and equivalents thereof.

Definitions

In describing and claiming the present invention, the following terminology will be used.

The singular forms "a," "an," and "the" include plural references unless the context clearly dictates otherwise. Thus, for example, reference to "a nanoparticle" includes reference to one or more of such structures, "a salt" includes reference to one or more of such materials, and "a mixing step" refers to one or more of such steps.

As used herein, "bilayer phyllosilicate" refers to a phyllosilicate material having a crystal structure with a positively charged surface on one face and a negatively charged surface on an opposite face. In some cases bilayer phyllosilicates can form flat sheets with oppositely charged top and bottom faces, or nanotubes with oppositely charged interior and exterior surfaces. Phyllosilicates in general are silicate minerals containing silicate tetrahedrons arranged in sheets. Non-limiting examples of phyllosilicates include halloysite, kaolinite, chrysotile, antigorite, talc, pyrophyllite, montmorillonite, chlorite, mica, sepiolite, serpentine, and others. In some cases, the phyllosilicates are natural unmodified nanomaterials. Bilayer phyllosilicates include halloysite, kaolinite, chrysotile, and antigorite.

As used herein, "nanoparticle" refers to a particle having a dimension in the nanoscale, such as from about 1 nm to about 1000 nm. Nanoparticles can include a variety of morphologies, such as nanospheres, nanoplatelets, nanotubes, and others.

As used herein, "lithium ion transference number" or "$t^+$" is defined as follows. An electrolyte is tested in a symmetric cell with lithium anode and lithium cathode surrounding the electrolyte. When a constant polarization voltage of 10 mV is applied to the cell, a current is measured from the initial value to a steady-state value after 4 hours. AC impedance plots of the film before and after polarization are obtained. The frequency range is from 300 kHz to 10 Hz and the signal amplitude is 10 mV. The $t^+$ is given by the following expression:

$$t^+ = \frac{I_S(V - I_0 R_0)}{I_0(V - I_S R_S)}$$

where V is the DC voltage applied to the cell; $R_0$ and $R_S$ are the initial and steady-state resistances of the passivating layer, respectively; and $I_0$ and $I_S$ are the initial and steady-state current, respectively.

As used herein, "conductivity" refers to lithium ion conductivity unless otherwise stated. Conductivity is typically given in units of siemens per centimeter (S cm$^{-1}$). The conductivity ($\sigma$) is:

$$\sigma = \frac{l}{SR_b}$$

where l is the thickness of the electrolyte, $R_b$ is the resistance of the electrolyte, and S is the area of the electrodes used to test the resistance of the electrolyte. The ionic conductivity values described herein were obtained by complex plane impedance plots between 25° C. and 100° C. with an impedance analyzer. The composite solid electrolyte film was sandwiched between a stainless steel (SS) disk with diameter d=1.6 cm and the positive shell of a 2025 coin cell to form a symmetric stainless steel/electrolyte/stainless steel cell for testing.

As used herein, "lithium iron phosphate" refers to $LiFePO_4$, and can be abbreviated "LFP." Additionally, an "LFP battery" refers to a battery in which the cathode contains lithium iron phosphate, and an "LFP cathode" refers to a cathode that contains lithium iron phosphate, while the cathode may also include other materials in addition to the lithium iron phosphate.

As used herein, "interfacial resistance" refers to charge transfer resistance at LFP/SPE interface and the solid electrolyte interface resistance at the Li-SPE interface. This interfacial resistance is measured by electrochemical impedance spectroscopy (EIS). For example, in the presented data herein, the semicircle in the middle frequency attributed to this interfacial resistance.

As used herein, "substantial" when used in reference to a quantity or amount of a material, or a specific characteristic thereof, refers to an amount that is sufficient to provide an effect that the material or characteristic was intended to provide. The exact degree of deviation allowable may in some cases depend on the specific context. Similarly, "substantially free of" or the like refers to the lack of an identified element or agent in a composition. Particularly, elements that are identified as being "substantially free of" are either completely absent from the composition, or are included only in amounts which are small enough so as to have no measurable effect on the composition.

As used herein, "about" refers to a degree of deviation based on experimental error typical for the particular property identified. The latitude provided the term "about" will depend on the specific context and particular property. The term "about" is not intended to either expand or limit the degree of equivalents which may otherwise be afforded a particular value. Further, unless otherwise stated, the term "about" shall expressly include "exactly," consistent with the discussion below regarding ranges and numerical data. However, unless otherwise enunciated, the term "about" generally connotes flexibility of less than 5%, most often less than 1%, and in some cases less than 0.01%.

Concentrations, dimensions, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a range of about 1 to about 200 should be interpreted to include not only the explicitly recited limits of 1 and 200, but also to include individual sizes such as 2, 3, 4, and sub-ranges such as 10 to 50, 20 to 100, etc.

As used herein, the term "at least one of" is intended to be synonymous with "one or more of." For example, "at least one of A, B and C" explicitly includes only A, only B, only C, and combinations of each.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Composite Solid Electrolytes

As mentioned above, many liquid and gel electrolytes for Li-ion batteries are flammable and create a risk of fire due to leakage of the electrolyte. In some examples of the present disclosure, a solid polymer-based electrolyte can be used instead of dangerous liquid or gel electrolytes. The solid polymer electrolyte can reduce or eliminate the risk of leakage of the electrolyte and subsequent fire hazard. Thus, the use of a solid polymer electrolyte instead of a liquid or gel electrolyte can drastically improve the safety aspects of a Li-ion battery. With the development of electric vehicle technology, enhanced safety characteristics for Li-ion batteries can be particularly beneficial. The solid polymer electrolytes described herein can offer many advantages in the area of large, high energy density batteries for electric propulsion, and in fuel cells for electric vehicles or stationary applications. At the other end of the spectrum, the solid polymer electrolytes can also be used for small portable electronic devices where the battery takes up a significant proportion of the size and weight of the device. The use of the solid polymer electrolytes instead of liquid or gel electrolytes can significantly improve the safety of Li-ion batteries.

In some examples, solid polymer electrolytes can include polyethylene oxide (PEO) polymers. However, PEO-based solid electrolytes often do not meet functional performance requirements for Li-ion batteries. For example, at low temperatures, the conductivity of the solid electrolytes can be poor due to the presence of crystalline PEO segments, which restricts the lithium ion mobility. In addition, the cycling performance of batteries assembled by such solid polymer electrolytes does not exhibit decent performance when the batteries are charged/discharged at relatively high current densities. In some cases, this limits the useful operating temperature of Li-ion polymer batteries employing such solid electrolytes to between 70° ° C. and 100° C., which excludes the use of solid polymer-based batteries in room temperature applications.

In some examples, the ion conductivity of the solid polymer electrolyte can be increased by adding certain nanoparticle fillers to the electrolyte. Fillers may be specially designed and manufactured for use in solid polymer electrolytes. However, some such fillers can have complicated and expensive production processes.

Some naturally-occurring materials can be used as fillers in the solid polymer electrolyte. Halloysite nanotubes (HNTs) are one material having a particular nanostructure that can be useful in the solid polymer electrolyte. HNTs have a tubular structure, which resembles carbon nanotubes in terms of geometric features. The nanotubes are composed of bilayers of alumina octahedral and silica tetrahedral sheets. The layers can also include waters of hydration. The neighboring alumina and silica layers, and their waters of hydration, can curve and form multilayer tubes. Depending on the state of hydration, HNTs are generally classified into two groups: hydrated HNTs with a crystalline structure having a 10 Å $d_{001}$ spacing, and dehydrated HINTs with 7 Å $d_{001}$ spacing. As used herein, "$d_{001}$ spacing" refers to the distance between adjacent layers in the HNT material. In general, the ultra-tiny hollow tubes vary in length from the submicron scale to several microns, in external diameter from approximately 10 nm to 190 nm, and in internal diameter from approximately 5 nm to 100 nm. Chemically, the siloxane external surface of HNT has properties similar to certain $SiO_2$ structures while the internal alumina core behaves like gibbsite. Thus, the zeta potential of HNT particles can be roughly described by a negatively charged outer layer of $SiO_2$, with a small contribution from the positive $Al_2O_3$ inner surface, which accounts for the overall negative surface charge of HNT particles. Due to their unique structure, HNTs have several applications, such as for controlled or sustained release, in nanoreactors or nanotemplates, as sorbents for contaminants and pollutants, etc. HNT's can also be used as the filler in either naturally-existing or modified forms in nanocomposites. In some cases HNTs can be dispersed relatively uniformly in thermoplastics by direct melt blending, especially for polymers with high polarity. Accordingly, in some examples, HNTs can be incorporated into the solid polymer electrolyte to form a composite solid electrolyte. In certain examples, this can be accomplished by direct melt blending, and in further examples, the HNTs can be in a natural-existing form or in a modified form.

In certain examples, HNTs can be particularly useful as a filler in solid polymer electrolytes for Li-ion batteries that include a lithium iron phosphate cathode. Much research on cathode materials for rechargeable Li-ion batteries has involved lithium insertion compounds with layered, spinel, or olivine structure. Lithium iron phosphate ($LiFePO_4$, LFP) is a promising alternative cathode material for Li-ion batteries. LFP has an olivine structure. One advantage of iron-based compounds is that, in addition to being relatively inexpensive and available in nature, iron-based compounds are less toxic than Co, Ni, and Mn. LFP cathodes offer good electrochemical performance with low resistance.

Development of advanced LFP polymer batteries is not only a matter of maximizing the ionic conductivity of the solid polymer electrolyte, but also, an issue of integration and compatibility of the solid polymer electrolyte and the electrodes. For example, HNT was used as a filler in the solid polymer electrolyte to provide enhanced electrochemical properties, and thus help to improve the battery cycling performance. However, this solid electrolyte material was found to be incompatible when used with a lithium iron phosphate-containing cathode in a LFP battery due at least partially to poor contact and increased interfacial resistance. However, with a minor addition of LFP to the solid electrolyte, improved compatibilities between electrolyte and electrodes have been achieved. Accordingly, in some examples, the composite solid electrolyte can include lithium iron phosphate.

The present disclosure describes composite solid electrolytes that can provide the economic and safety benefits of solid polymer electrolytes while also providing adequate lithium ion conductivity to make batteries with good performance. The composite solid electrolyte can be made in the form of a flexible thin membrane. This electrolyte can be advantageously used for solid-state micro-scale lithium batteries due to the small size and weight of the electrolyte. Similar advantages can be gained by co-locating micro-scale batteries and integrated circuits on a single chip. The composite solid electrolyte can also make battery cells safer by eliminating flammable and reactive liquid electrolytes. Thus, the electrolyte can potentially be used in safe, non-flammable, lightweight batteries for electric vehicles. The electrolyte can be compatible with lithium iron phosphate cathodes, and therefore can be used in LFP batteries. Finally, the electrolyte can have adequate lithium ion conductivity across a wide range of temperatures, including room temperature. As a general guideline, functional operating temperatures can range from about −10° C. to 100° C., while rechargeable cycling temperatures can range from about 25° C. to 60° C. As a general guideline, lithium ion conductivity can be greater than about $10^{-5}$ S/cm and most often about $10^{-4}$ S/cm. This allows for batteries that can be used in a variety of commercial applications.

In one example of the present technology, a composite solid electrolyte can include a solid polymer, a lithium salt distributed in the solid polymer, and lithium iron phosphate distributed in the solid polymer. FIG. 1 shows a schematic cross section (not to scale) of one example of a composite solid electrolyte 100. The composite solid electrolyte includes a matrix of a solid polymer 110 with lithium ions 120 and lithium iron phosphate 130 dispersed therein. The lithium iron phosphate can be in a particulate form having an olivine structure. This combination of materials can have good ion conductivity at room temperature for use in a lithium ion battery (e.g. an ionic conductivity of at least about $10^{-4}$ S/cm at room temperature). Such a solid composite electrolyte is also compatible with LFP cathodes, and can be used in LFP batteries.

Figure 2:
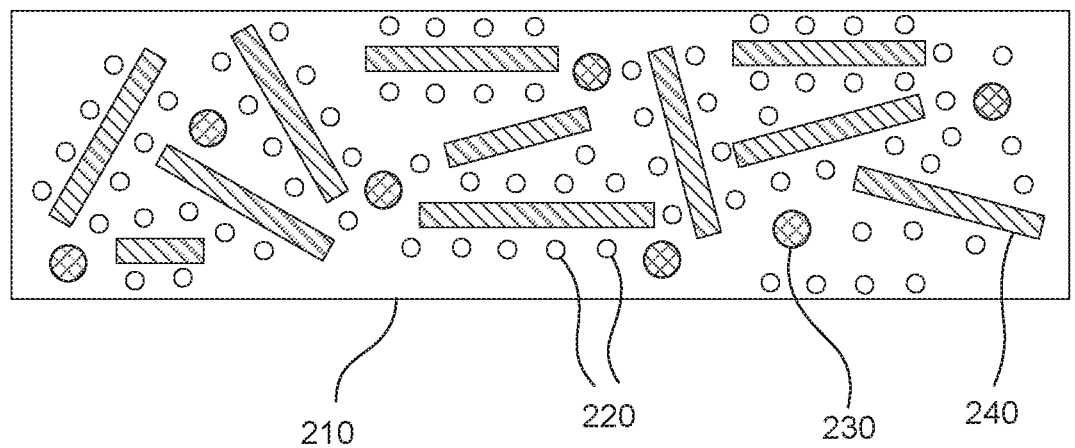
FIG. 2 is a schematic cross sectional view of another example composite solid electrolyte in accordance with an example of the present disclosure.

The composite solid electrolytes described herein can also include phyllosilicate nanoparticles distributed in the solid polymer. FIG. 2 shows another schematic cross section and another example composite solid electrolyte 200. This composite solid electrolyte includes a solid polymer 210 with lithium ions 220 and lithium iron phosphate 230 distributed therein. Phyllosilicate nanoparticles 240 are also distributed in the polymer.

In certain examples, the solid polymer of the composite solid electrolyte can be a polyether such as polyethylene oxide or polypropylene oxide. Additional non-limiting examples of suitable solid polymers can include polymethyl methacrylate, polycarbonate, polysiloxane, starch, sugar, fiber, polyvinyl alcohol, polyphosphazene and polystyrene. Combinations and copolymers of the above polymers can also be used in some examples. In various examples, the solid polymer can have a weight average molecular weight from 100 Mw to 100,000,000 Mw or from 1,000 Mw to 10,000,000 Mw. Such polymers can sometimes be used as polymeric electrolytes without the addition of the phyllosilicate nanoparticles. However, the polymers can have crystallinity at low temperatures that reduces the conductivity of the polymer at low temperatures. Thus, these polymers may be usable as electrolytes only at high temperatures, such as 70° C. or higher. Without being bound to a particular mechanism, it is believed that adding phyllosilicate nanoparticles to the polymer can inhibit the crystallization of the polymer chains, which leads to increased low temperature conductivity.

Figure 3:
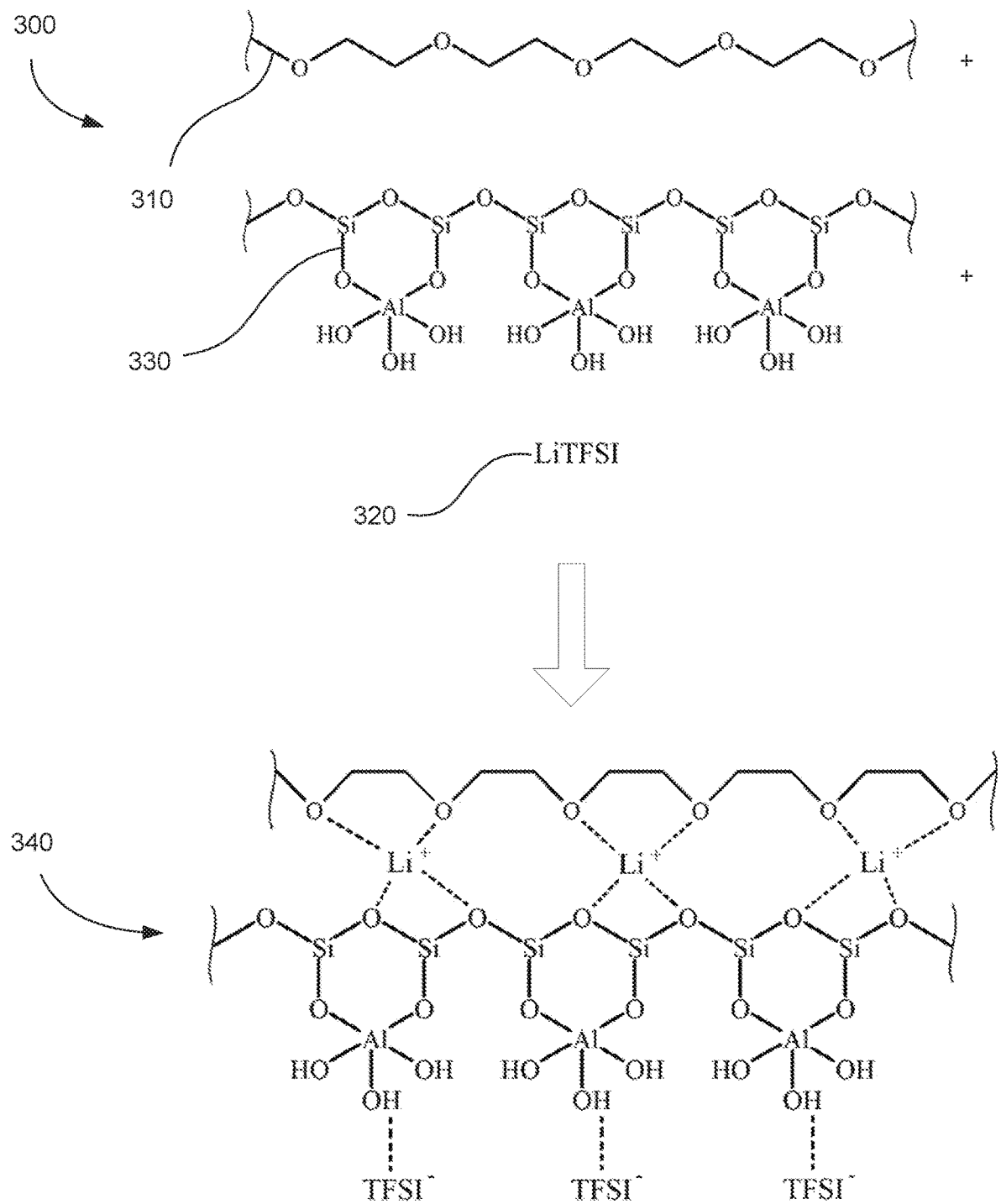
FIG. 3 shows a mechanism of interaction between polyethylene oxide, lithium bis-trifluoromethanesulfonimide, and a halloysite nanotube, in accordance with an example of the present disclosure.

Additionally, the differing charged surfaces of the bilayer structure of the phyllosilicate can further improve low temperature and high temperature ionic conductivity over and above the crystallization inhibiting effect described above. The charge properties of bilayer phyllosilicates have surprisingly been found to provide even better low temperature and high temperature ionic conductivity compared to other inorganic particles that have been added to polymeric electrolytes. Without being bound to a specific mechanism, it is believed that specific interactions occur between surface groups of the bilayer phyllosilicate and the lithium salt and polymer. These interactions can be interpreted in terms of Lewis acid-base group interactions. One example of this mechanism 300 is shown in FIG. 3. In this example, a segment of polyethylene oxide (PEO) 310 is shown being combined with lithium bis-trifluoromethanesulfonimide (LiTFSI) 320, and a segment of a halloysite nanotube 330. Combining these materials forms the composite 340.

In one particular aspect, the phyllosilicates can be bilayer phyllosilicates. The bilayer phyllosilicates can generally be either planar (e.g. kaolinite, antigorite, etc.) or nanotubular (e.g. halloysite, chrysotile, etc.). The halloysite nanotube has a bilayer structure with the chemical composition $Al_2Si_2O_5(OH)_4$. The exterior face of the nanotube contains $SiO_2$ and the interior face contains $Al(OH)_3$. These faces exhibit a difference in the sign of surface charge for certain conditions, which provide more Lewis acid-base interaction sites. Lewis acid-base sites interact with the ionic species $Li^+$ and $TFSI^-$, thus lowering ionic coupling. This can promote salt dissociation via a sort of "ion-halloysite-nanotube complex" formation. As shown in FIG. 3, the $Li^+$ ions can complex with the exterior surface of the nanotube while the TFSI ions can complex with the interior surface. The ethylene oxide units on PEO also have an abundance of lone-pair electrons that can interact with the Li+ ions on the outer HNT surface, as the polymer becomes organized and conformed to the HNT nanoparticles. The Lewis acid-base interactions among HNT, LiTFSI, and PEO effectively order the ions into 3D channels. These interactions can significantly shorten the distance of free Li+ ion transfer, lower ionic coupling, disturb the PEO crystallinity, decrease the phase transition temperature, and provide a high-speed freeway for lithium ion transport through the composite solid electrolyte.

Halloysite nanotubes (HNTs) are based on aluminosilicate clay nanosheets that naturally occur as hollow tubular structures. This mineral can be mined from deposits in Utah in the United States as well as in other deposits around the world. The ideal unit formula for halloysite is $Al_2Si_2O_5(OH)_4 \cdot nH_2O$ (n=0 for halloysite-(7 Å) and n=2 for hydrated halloysite-(10 Å). Unlike other nano-structured clays that are exfoliated to form small particles before use, HNTs naturally occur with typical dimensions of 10-190 nm for the outer diameter and 5-100 nm for the inner diameter, with a length of 50 to 5000 nm. In certain examples, the outer diameter of the HNTs used in the composite solid electrolyte can be from 10 nm to 190 nm or from 10 nm to 50 nm. In further examples, the inner diameter can be from 5 nm to 100 nm or from 5 nm to 20 nm. In still further examples, the length of the HNTs can be from 50 nm to 5000 nm or from 100 nm to 1000 nm. As is the case for many clays, the halloysite structure has two components: (1) sheets of corner shared silica tetrahedra and (2) sheets of edge shared alumina octahedra. The layers building up the final structure are composed by one of each of these sheets so that the crystal structure of halloysite is described as 1:1 dioctahedral layered silicate. Compared to other nanomaterials, such as carbon nanotubes, graphene etc., the halloysite nanotubes have several advantages. For example halloysite nanotubes are a natural nanotube material of low cost having excellent chemical and physical stability.

Other bilayer phyllosilicate nanoclays have similar chemical compositions and can provide similar improvement in ionic conductivity. For example, kaolinite is a bilayer phyllosilicate clay and has the same chemical composition ($Al_2Si_2O_5(OH)_4$) as that of halloysite. Kaolinite can also provide improvement in conductivity when kaolinite nanoparticles are used to synthesize the nanocomposite electrolyte.

In some examples, modification of phyllosilicates can further improve the ionic conductivity. Therefore, in addition to halloysite nanotubes, other phyllosilicate structures and modifications of such structures can be used for nanocomposite electrolytes in lithium ion batteries. In various examples, the phyllosilicates can be bilayer, trilayer or mixed layer structures and include both tubular structures and flat, layered structures. In certain examples, the phyllosilicates can be either aluminum or magnesium phyllosilicates which can be modified to promote the transport of lithium ions. In one such example, the modification can include, but is not limited to, replacement of interlayer cations with lithium ions.

Non-limiting examples of phyllosilicates that can be used in the composite solid electrolyte can include kaolinite, halloysite, chrysotile, antigorite, talc, pyrophyllite, montmorillonite, chlorite, mica, sepiolite, serpentine, and others.

Composite solid electrolytes according to the present technology can be formed to have advantageous properties for use in solid state batteries. For example, the composite solid electrolyte can have good ionic conductivity, lithium ion transference number, weight, chemical stability, thermal stability, mechanical stability, and flexibility. The properties can be influenced by the composition of the composite solid electrolyte. The type of polymer, lithium salt, and bilayer phyllosilicate used can affect the properties of the resulting electrolyte. The relative amounts of these components can also affect the properties.

In certain examples, the composite solid electrolyte can include from 1 wt % to 30 wt % bilayer phyllosilicate nanoparticles. In more specific examples, the composite solid electrolyte can include from 5 wt % to 15 wt % bilayer phyllosilicate nanoparticles. The ratio of polymer to lithium salt can also affect the properties of the electrolyte. For polyether polymers, the molar ratio of monomer units to lithium ions can be calculated. For example, if the polymer is polyethylene oxide, then the molar ratio of ethylene oxide (EO) units to lithium ions from the lithium salt can be calculated. In some examples, this EO:Li ratio can be from 8:1 to 25:1. In more specific examples, the EO:Li ratio can be from 10:1 to 20:1. For other polymers, a ratio of monomer units to lithium ions can be in the same ranges.

In various examples, the composite solid electrolyte can comprise the solid polymer, lithium salt, lithium iron phosphate, and bilayer phyllosilicate nanoparticles as well as additional additives. In some examples, the composite solid electrolyte can consist of or consist essentially of the solid polymer, lithium salt, lithium iron phosphate, and bilayer phyllosilicate nanoparticles. In a particular example, the solid polymer, lithium salt, lithium iron phosphate, and bilayer phyllosilicate nanoparticles can together make up 95% or more of the total weight of the composite solid electrolyte or 99% or more of the total weight of the composite solid electrolyte.

In a particular example, the bilayer phyllosilicate nanoparticles can be halloysite nanotubes, the polymer can be polyethylene oxide, and the lithium salt can be LiTFSI. The amount of halloysite nanotubes in the composite solid electrolyte can be about 10 wt %. The remainder of the composite solid electrolyte can consist of polyethylene oxide, LiTFSI, and lithium iron phosphate. The molar ratio EO:Li in this example can be about 15:1.

In other examples, the ionic conductivity of the composite solid electrolyte can be affected by using phyllosilicate nanotubes grafted with short chain functional groups. The functional groups can bind with the inside atoms of the nanotube and occupy the volume within the nanotubes, providing a high ionic conductivity pathway for ions within the nanotubes. The short chain functional group can be carbonate, ethylene oxide, and phosphazene, although other groups can be suitable.

As mentioned above, the composite solid electrolyte can be formed to have useful properties for use in lithium batteries. In some examples, the composite solid electrolyte can have a sufficient ionic conductivity across a range of temperatures, including room temperature, to be useful in lithium batteries. In one example, the composite solid electrolyte can have an ionic conductivity of greater than $10^{-4}$ S $cm^{-1}$ at 25° C. For example, the ionic conductivity can be from $10^{-4}$ S $cm^{-1}$ to 1 S $cm^{-1}$ at 25° C. The ionic conductivity can also increase with increasing temperature. In a further example, the composite solid electrolyte can have an ionic conductivity of greater than $10^{-3}$ at 60° C. For example, the ionic conductivity can be from $10^{-3}$ S $cm^{-1}$ to 10 S $cm^{-1}$ at 60° C.

The composite solid electrolytes according to the present technology can also have a suitable lithium ion transference number ($t^+$). In some examples, the lithium ion transference number can be from 0.3 to 0.5. In further examples, the lithium ion transference number can be from 0.4 to 0.5. This can compare favorably to a pure PEO electrolyte, which can have a lithium ion transference number from about 0.1 to about 0.25.

Electrochemical stability of the composite solid electrolyte can be characterized by the decomposition voltage, or the highest voltage that can be applied to the electrolyte before the electrolyte chemically decomposes. In some examples, the composite solid electrolyte can have a decomposition voltage from 5 V to 7 V at 25° C., and in some cases about 5.02 V. In further examples, the composite solid electrolyte can have a decomposition voltage from 4.5 V to 6 V at 100° C. The decomposition voltage of the composite solid electrolyte can compare favorably to commercially available liquid organic electrolytes, many of which decompose at around 4.2 V.

Methods of Making Composite Solid Electrolytes

The present technology also extends to methods of making composite solid electrolytes. In one example, a method of making composite solid electrolytes can include: dispersing bilayer phyllosilicate nanoparticles in a solvent; dissolving a solid polymer in the solvent; dissolving a lithium salt in the solvent; dissolving lithium iron phosphate in the solvent; and removing the solvent to form the composite solid electrolyte. In some non-limiting examples, the solvent can include acetonitrile, acetone, alcohol, N-methyl-2-pyrrolidone, tetrahydrofuran, pyridine, dimethyl sulfoxide and water. In a particular example, the solvent can be acetonitrile.

The amounts of solvent, bilayer phyllosilicate nanoparticles, lithium salt, lithium iron phosphate, and polymer mixed in this process can generally be any amounts sufficient to form a composite solid electrolyte having the desired properties. In some examples, the concentration of solids (including the phyllosilicate nanoparticles, lithium salt, lithium iron phosphate, and polymer) dispersed or dissolved in the solvent can be from 0.1 mg/mL to 20 mg/mL. In further examples, the concentration of solids can be from 1 mg/mL to 10 mg/mL.

The solid components can be mixed with the solvent by any suitable mixing method for a sufficient time to form a homogeneous dispersion. In one example, the solid components can be added to the solvent and the mixture can be stirred for 1 to 5 hours. In a particular example, the bilayer phyllosilicate nanoparticles can be added to the solvent first, and then stirred for 30 minutes to 1 hour. The lithium salt and polymer can then be added, and the mixture can be stirred for an additional 1 to 4 hours.

The dispersion of solid components in the solvent can be dried to form the composite solid electrolyte. In various examples, the dispersion can be molded, formed into sheets, coated on substrates, or otherwise shaped and then allowed to dry. In one example, a quantity of the dispersion can be dropped onto a flat surface and allowed to dry, forming a dried composite solid electrolyte layer. The dried layer can then be peeled off and used in a battery. Layers and sheets of the composite solid electrolyte can be cut, shaped, folded, bent, curved, and so on as convenient for forming a lithium battery electrolyte. In some examples, a composite solid electrolyte layer can be formed with the same dimensions as an anode and cathode for a battery, and then the electrolyte layer can be pressed between the anode and cathode to form a battery cell.

Solid State Lithium Battery Cells

The present technology also encompasses solid state lithium battery cells employing the composite solid electrolytes described above. In one example, a solid state lithium battery cell can include a composite solid electrolyte layer, an anode in contact with a first surface of the composite solid electrolyte layer, and a cathode in contact with a second surface of the composite solid electrolyte layer. Thus, the battery can typically be entirely solid throughout the device (e.g. anode, electrolyte and cathode are each solid and in contact with one another having no intervening gas or liquid interface). The composite solid electrolyte layer can include a solid polymer, a lithium salt distributed in the solid polymer, and lithium iron phosphate distributed in the solid polymer. The anode can contain lithium.

Figure 4:
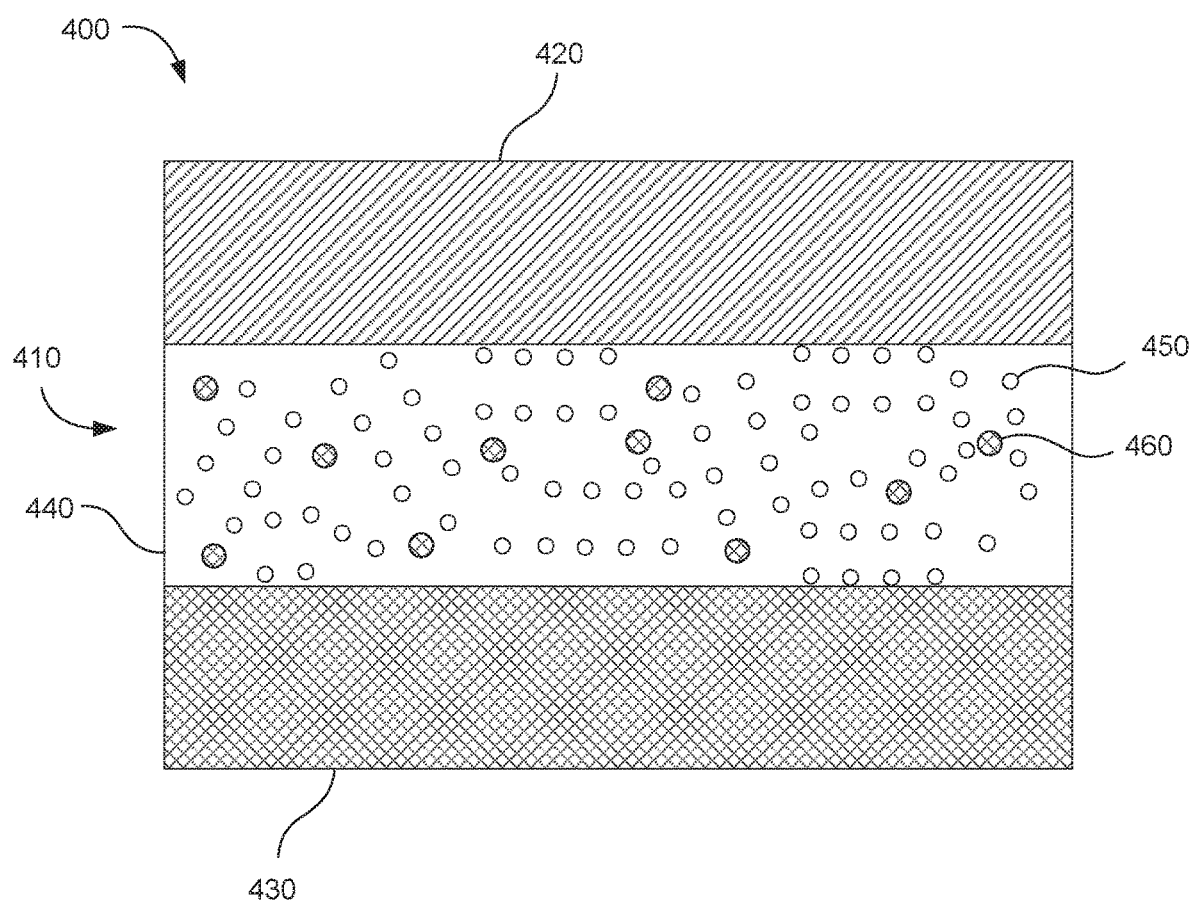
FIG. 4 is a schematic cross sectional view of an example solid state lithium battery cell in accordance with an example of the present disclosure.

FIG. 4 shows one example of a solid state lithium battery cell 400 in accordance with the present technology. The battery cell includes a composite solid electrolyte 410 between an anode 420 and a cathode 430. The composite solid electrolyte is made up of a solid polymer 440 having lithium ions 450 and lithium iron phosphate 460 distributed therein.

Figure 5:
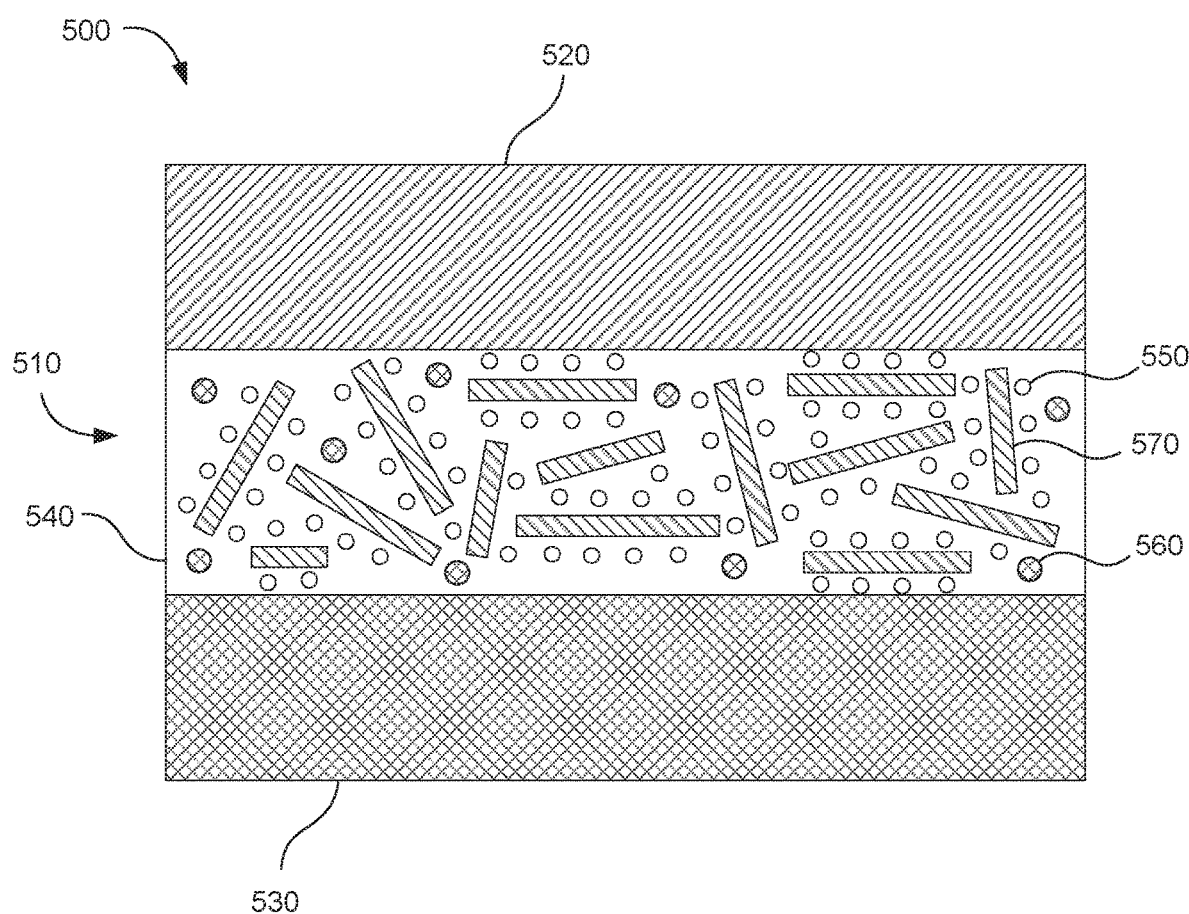
FIG. 5 is a schematic cross sectional view of another example solid state lithium battery cell in accordance with an example of the present disclosure.

FIG. 5 shows another example solid state lithium battery cell 500 in accordance with the present technology. This battery cell includes a composite solid electrolyte 510 between an anode 520 and a cathode 530. The composite solid electrolyte is made up of a solid polymer 540 having lithium ions 550, lithium iron phosphate 560, and phyllosilicate nanoparticles 570 distributed therein.

In some examples, the anode can include lithium. In certain examples, the anode can consist of or consist essentially of lithium metal. In further examples, the cathode can include lithium iron phosphate. In further examples, the cathode can also include conductive carbon. In certain examples, the cathode can include a polymeric binder to bind together lithium iron phosphate and conductive carbon.

Battery cells employing the composite solid electrolytes described herein can have good power density and energy density. In some examples, the energy density, or capacity, of a battery can decrease from an initial value to a lower value after one or more charge/discharge cycles. Typically, charging and discharging at a lower C value can preserve a higher capacity. In one example, a battery according to the present technology can have an initial discharge capacity of at least 1200 mAh $g^{-1}$ and the discharge capacity can decrease to a lower discharge capacity of at least 600 mAh $g^{-1}$ after 100 cycles at 0.1 C at 25° C. When discharged at a higher C and/or at a higher temperature, the discharge capacity can decrease more. In one example, a battery can have a reduced capacity of at least 300 mAh $g^{-1}$ after 400 cycles at 4 C and 100° C. Thus, a useful capacity can be maintained even when used at high C and high temperature. In certain examples, a battery can have an initial discharge capacity from 1200 mAh $g^{-1}$ to 2400 mAh $g^{-1}$ and a reduced discharge capacity from 600 mAh $g^{-1}$ to 1200 mAh $g^{-1}$ after 100 cycles at 0.1 C at 25° ° C. In other examples, the battery can have a reduced discharge capacity of 300 mAh $g^{-1}$ to 600 mAh $g^{-1}$ after 400 cycles at 4 C and 100° C.

Solid state lithium batteries according to the present technology can be made to have any suitable form factor. For example, a solid state lithium battery can be in a metal or plastic hard sided casing, a flexible polymer pouch, a cylindrical battery casing, an integrated battery formed on a microchip or circuit board, and so on. Multiple solid state lithium battery cells can be combined in series or parallel to provide more voltage and/or capacity.

Figure 6A:
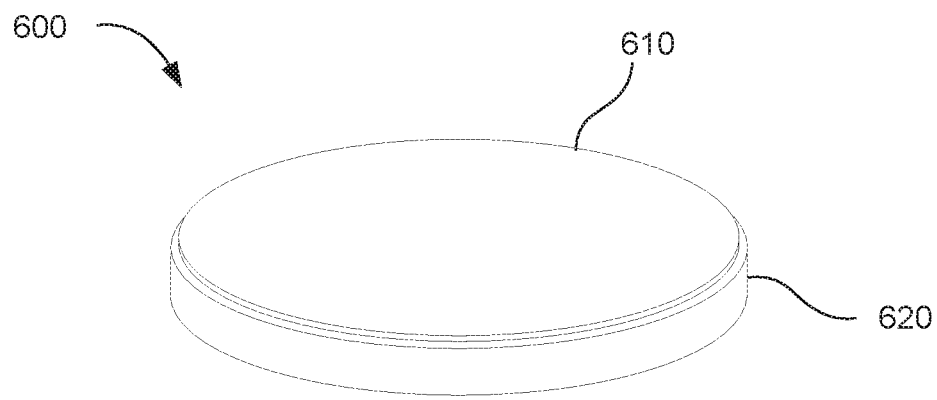
FIG. 6A is a perspective view of an example solid state lithium battery having a coin cell form factor in accordance with an example of the present disclosure.
Figure 6B:
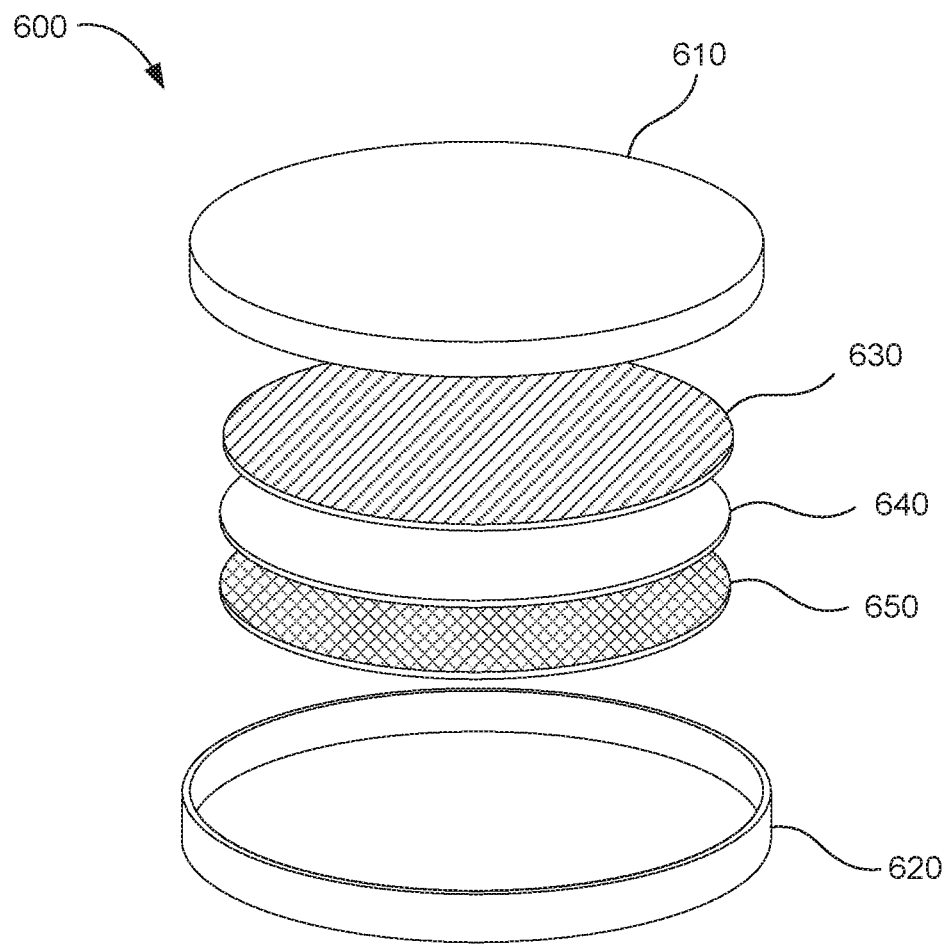
FIG. 6B is an exploded view of the example solid state lithium battery shown in FIG. 6A.

FIGS. 6A and 6B show one example of a solid state lithium battery 600 having a coin cell form factor. The coin cell has a stainless steel anode casing 610 and a stainless steel cathode casing 620 containing the other battery components. FIG. 6B shows an exploded view, with a lithium anode 630, composite solid electrolyte layer 640, and a lithium iron phosphate-based cathode 650 inside the casing.

It is to be understood that the above-referenced arrangements are illustrative of the application for the principles of the present invention. Thus, while the present invention has been described above in connection with the exemplary embodiments, numerous modifications and alternative arrangements can be made without departing from the principles and concepts of the invention as set forth in the claims.

EXAMPLES

1. Materials

Polyethylene oxide (PEO, MW=4×10$^6$) was obtained from Xiamen TOB New Energy Technology Company, China. Lithium bis(trifluoromethanesulfonyl)imide (LiN(SO$_2$CF$_3$)$_2$, LiTFSI, 99.5%) and halloysite nanotubes (HNT, 99.5%) were purchased from Sigma-Aldrich, USA. Lithium iron phosphate (LiFePO$_4$, LFP) was acquired from Hydro-Québec, Canada. Acetonitrile was of analytical grade, and used without further purification. All the powder materials were dried before use.

2. Preparation of Flexible Composite Solid Electrolyte

The composition of the PEO+LiTFSI+HNT+LFP composite solid electrolyte (HNT-LFP/electrolyte) was EO:Li$^+$=15:1 molar ratio, PEO:HNT=10:1 weight ratio and 1% LFP weight ratio (i.e. total weight of dry composition). During the preparation of each sample, HNT, LiTFSI and LFP were weighed and dispersed with acetonitrile in a glass bottle. After 5 minutes of ultrasonic treatment, the solution was mixed using a Teflon impeller. PEO was then added to the solution under vigorous stirring. The mixture was stirred for 4 hours, and then transferred to a vibrating ball mill for 20 minutes of ball milling to get a homogeneous electrolyte suspension. The suspension was cast on a clean plastic surface using a syringe, and dried into a thin film. A PEO+LiTFSI+HNT composite solid electrolyte without the LFP (HNT/electrolyte) and PEO+LiTFSI+LFP composite solid electrolyte without the HNT (LFP/electrolyte) were prepared using the same method.

3. Characterization of Flexible Composite Solid Electrolyte

Figure 7:
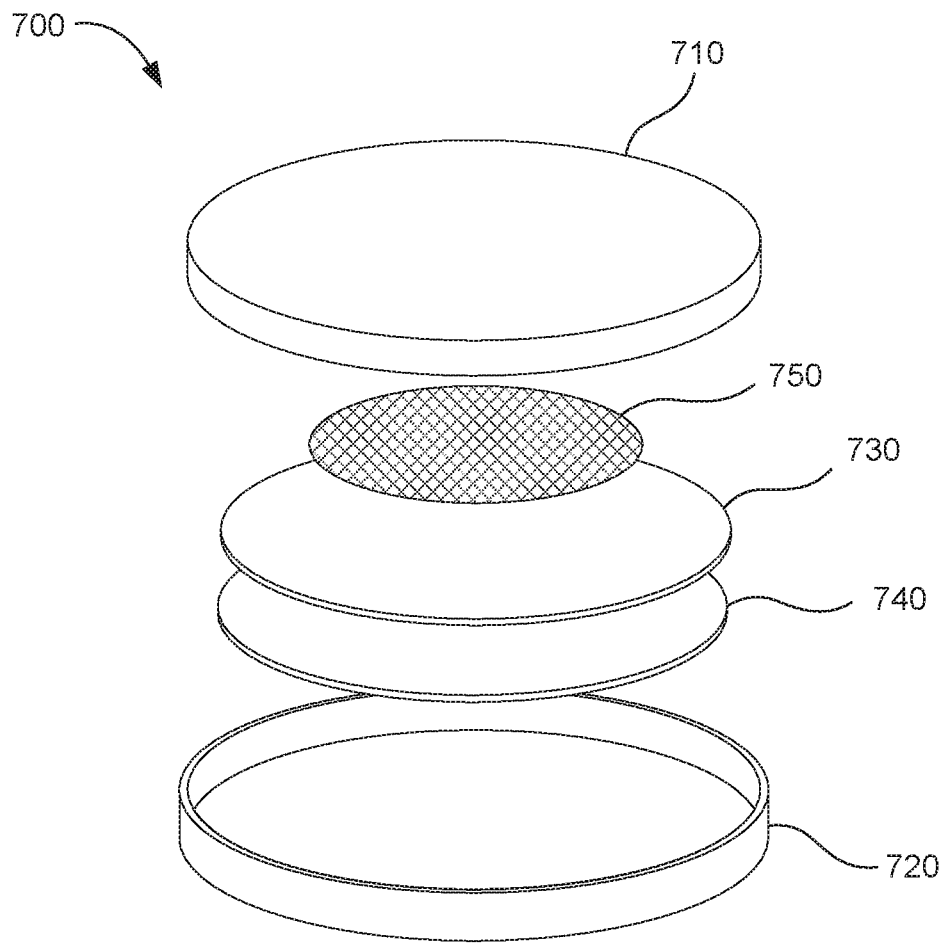
FIG. 7 is an exploded view of a symmetric test cell to test ionic conductivity of a solid electrolyte in accordance with an example of the present disclosure.

The electrochemical properties of the composite solid electrolytes were measured using a Gamry PCI4/750 Potentiostat (Gamry Instrument, USA). The ionic conductivities of the electrolyte films were evaluated by complex plane impedance plots between 25° C. and 100° C. Each film was sandwiched between a stainless steel (SS) disk (d=1.6 cm) and the positive shell of a 2025 coin cell to form a symmetric SS/electrolyte/SS cell, as shown in FIG. 7. The cell 700 shown in FIG. 7 includes an anode shell 710, a cathode shell 720, a stainless steel disc 730, the composite solid electrolyte film 740 between the stainless steel disc and the cathode shell, and a nickel net 750 between the stainless steel disc and the anode shell. The equation for calculating the conductivity is $$\sigma = \frac{1}{SR_b}$$

where l is the thickness of the electrolyte, $R_b$ is the resistance of the electrolyte measured from electrochemical impedance spectroscopy (EIS), and S is the area of the blocking stainless steel electrodes.

The lithium ion transference number (t$^+$) was tested in a symmetrical cell (Li/electrolyte/Li). A constant polarization voltage of 10 mV was applied to the cell and the currents from the initial to the steady state were measured. The lithium ion transference number is given by the following equation:

$$t^+ = \frac{I_s(V - I_0 R_0)}{I_0(V - I_s R_s)}$$

where V is the DC voltage applied to the cell, $I_0$ and $R_0$ are the initial current and resistance, and $I_s$ and $R_s$ are the steady-state current and resistance, respectively.

The electrochemical windows of the composite solid electrolyte films were measured by linear sweep voltammetry using Li/electrolyte/SS cells with a scan range from 3-6.5V, at a scan rate of 10 mV/s.

Thermogravimetric analysis (TGA) and differential scanning calorimetry (DSC) were conducted by an SDT Q600 instrument to investigate thermal stability of HNT-LFP/electrolyte. The experiment was conducted in an argon atmosphere (flow rate 200 ml/min) at a heating rate of 10° C./min.

The HNT-LFP/electrolyte based lithium iron phosphate polymer batteries were assembled by contacting in sequence a lithium metal disk anode (d=15.6 mm, thickness=0.3 mm), the electrolyte film, and an LFP cathode disk (d=10 mm). The LFP cathode slurry was prepared by grinding and dispersing the LFP, conductive carbon, and polyvinylidene fluoride (PVDF) in N-methylpyrrolidone (NMP) solvent at a weight ratio of 8:1:1. The slurry was cast on aluminum foil using a doctor blade to form a uniform cathode layer. The aluminum foil was dried on a hot plate at 100° C. overnight prior to coin cell assembly. The whole system was housed and sealed in a 2025 coin cell to build a Li/electrolyte/LFP battery. Galvanostatic charge/discharge cycling was performed in a LAND CT2001A battery test system (Wuhan LAND Electronics Co., Ltd., China).

4. Ionic Conductivity

Figure 8:
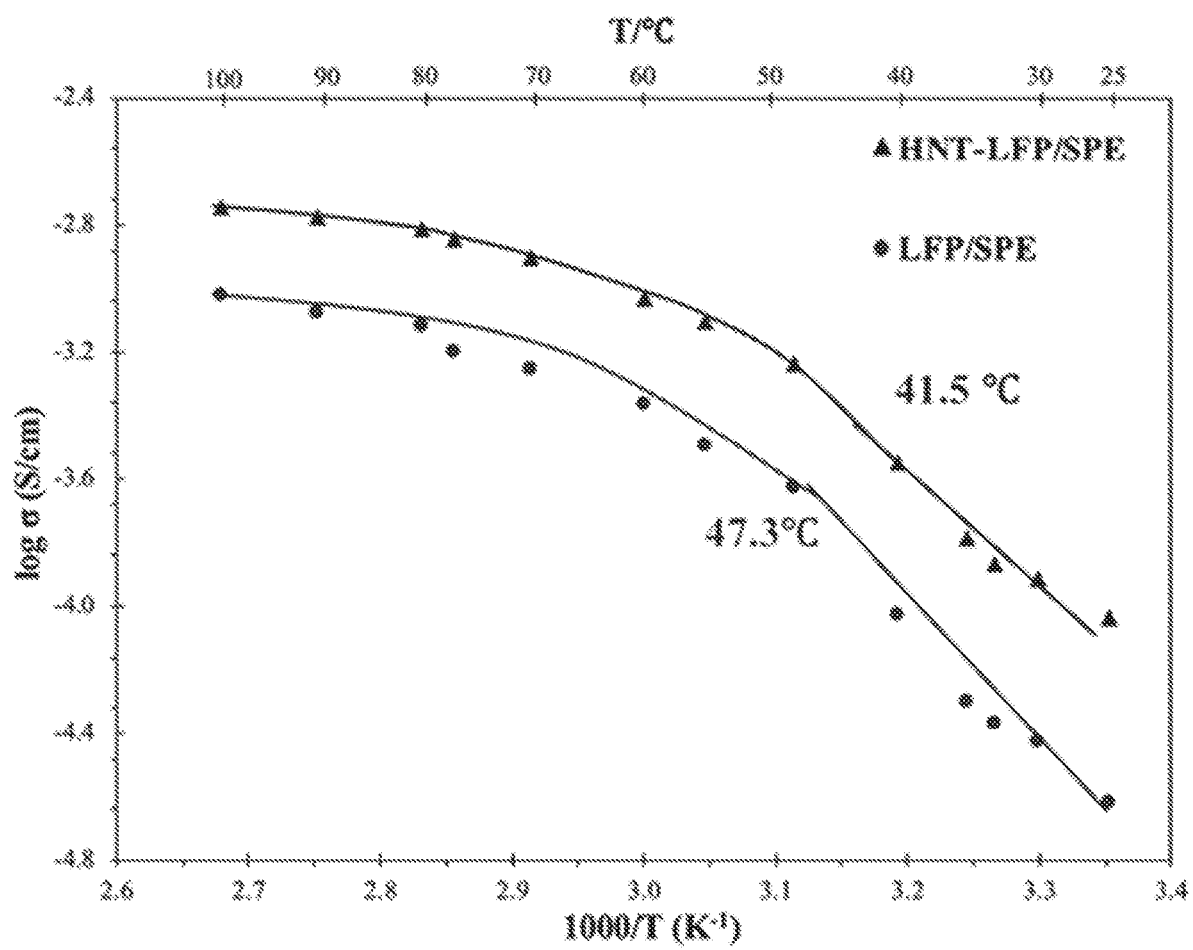
FIG. 8 is a graph of ionic conductivity vs. temperature for two solid electrolytes in accordance with examples of the present disclosure.

Previous studies found that ionic conduction behavior of solid polymer electrolytes was sensitive to the crystallinity of the PEO based electrolyte, the ionic conductivity being greater in the amorphous state than in the crystalline state. In order to determine the phase transition temperature of the HNT-LFP/electrolyte, ionic conductivities from 25° C. to 100° C. were measured, as presented in FIG. 8 (showing ionic conductivity results of HNT-LFP/electrolyte and LFP/electrolyte). The ionic conductivities of the electrolyte are $9.23 \times 10^{-5}$ S/cm and $1.79 \times 10^{-3}$ S/cm at 25° C. and 100° C., respectively. The experimental data in FIG. 8 is fitted by the Arrhenius equation at low temperatures (linear, crystalline phase) and by the Vogel-Tamman-Fulcher (VTF) equation at high temperatures (non-linear curve, amorphous phase). So, the phase transition temperatures were measured at the crossing point of the two fitted lines, and found to be 41.5° C.

The ionic conductivity of electrolyte prepared without HNT was also measured and plotted in FIG. 8. The ionic conductivities of the electrolyte were $2.42 \times 10^{-5}$ S/cm and $9.54 \times 10^{-4}$ S/cm at 25° C. and 100° C., respectively. The phase transition temperature was determined to be 47.3° C. Thus, the addition of HNT helped enhance the ionic conductivity, and also, decreased the crystallization temperature of the composite solid electrolyte.

5. Lithium Ion Transference Number ($t^+$)

Figure 9:
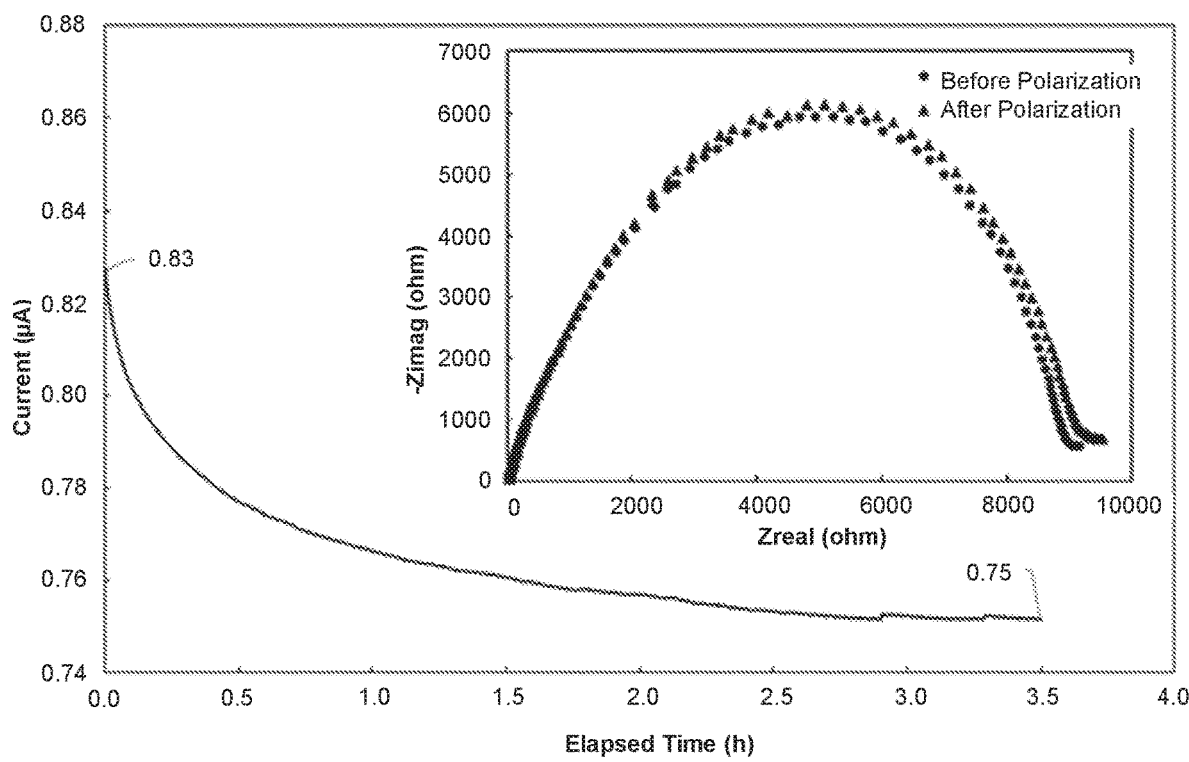
FIG. 9 is a graph of chronoamperometry of a lithium/solid polymer electrolyte/lithium cell in accordance with an example of the present disclosure.

Apart from the high ionic conductivity, the HNT-LFP/electrolyte also exhibited a higher lithium ion transference number ($t^+$), as shown in FIG. 9 (showing chronoamperometry of the Li/electrolyte/Li Cell for the HNT-LFP/electrolyte at a potential of 10 mV at 25° C.; Inset: the EIS of the same cell before and after the polarization). The $t^+$ was measured using electrochemical impedance spectroscopy combined with a potential polarization. Before polarization, both cations and anions move between the electrodes and contribute to the current, while at steady state, only lithium ions transport between the electrodes. The value measured for the HNT-LFP/electrolyte was 0.46, which is much higher than that of pure PEO at room temperature, the value of which is usually within the range of 0.1-0.25.

6. Electrochemical Stability

Figure 10:
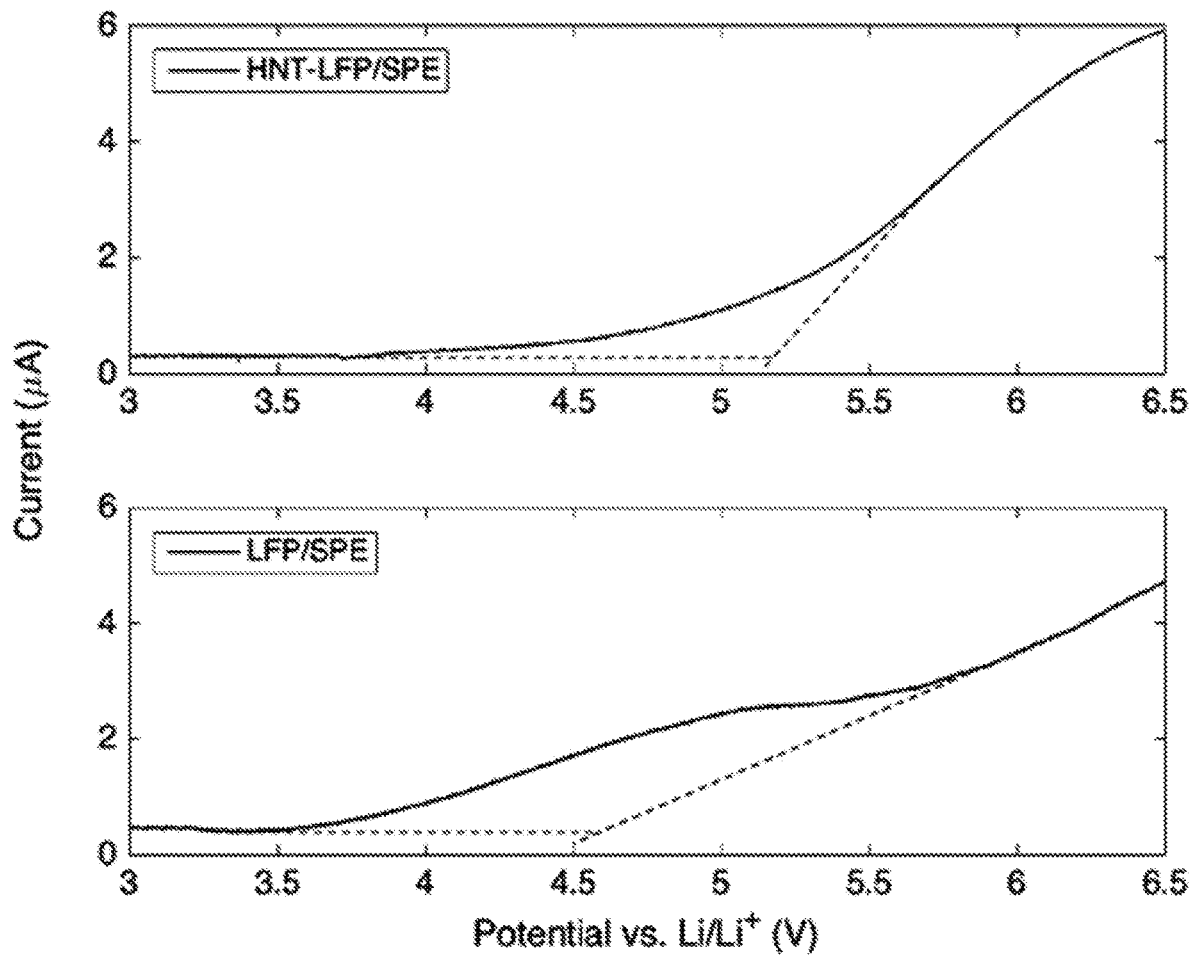
FIG. 10 is a graph of linear sweep voltammetry results of two solid polymer electrolytes in accordance with examples of the present disclosure.

The electrochemical stabilities of the HNT-LFP/electrolyte and LFP/electrolyte at room temperature were measured using linear sweep voltammetry in the potential range of 3.0 V to 6.5 V (vs. $Li^+$/Li), as shown in FIG. 10 (linear sweep voltammetry results at 25° C. at a rate of 10 mV/s). It was found that the HNT-LFP/electrolyte was stable up to 5.14 V at 25° C. In contrast, the composite solid electrolyte prepared without HNT was only stable up to 4.32 V. But both values are still higher than the decomposition voltage of commercial liquid organic electrolytes (~4.2 V). The electrochemical stability was greatly enhanced by adding HNT. Therefore, the HNT-LFP/electrolyte can be suitable for high voltage applications.

7. Battery Cycling Performance

Figure 11:
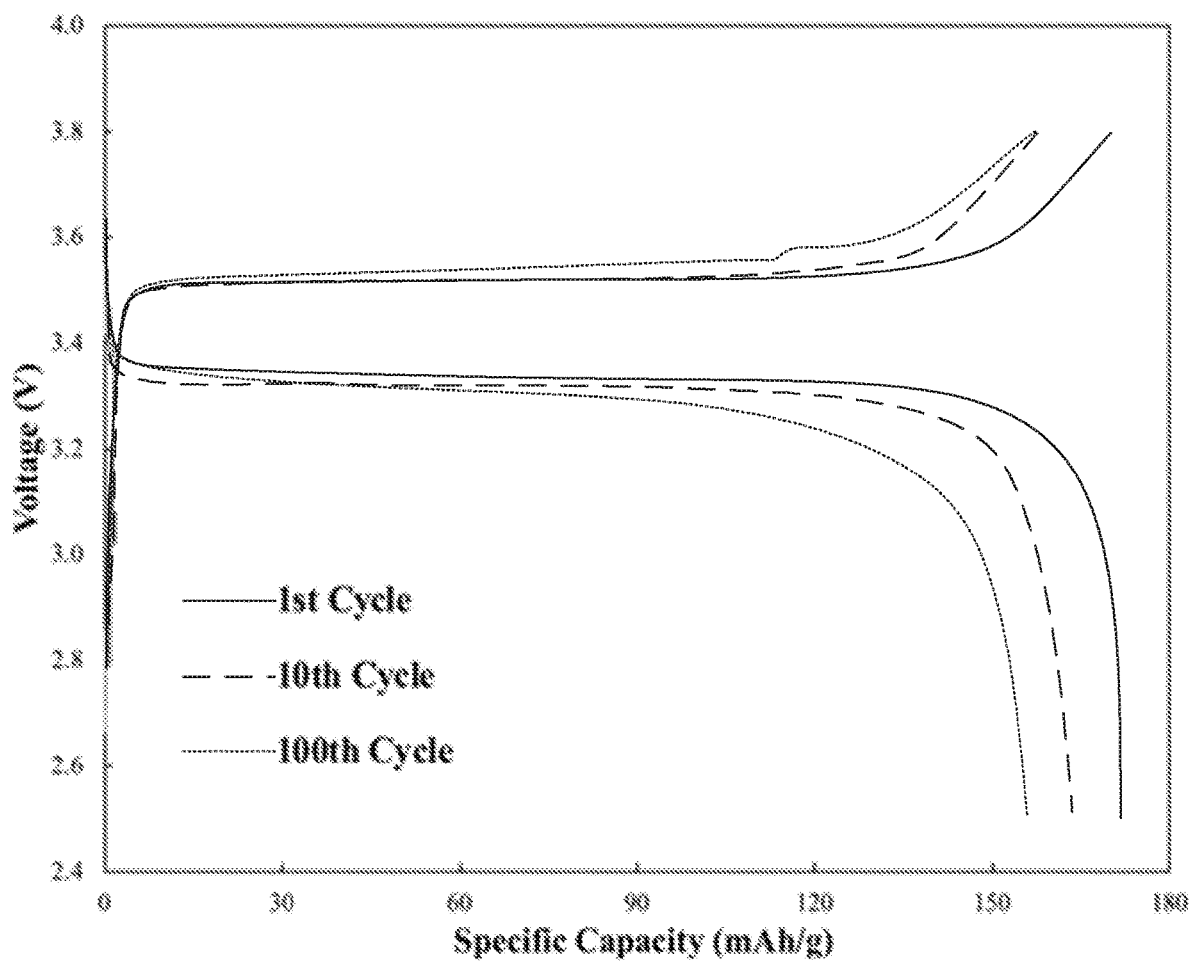
FIG. 11 is a graph of potential vs. capacity profiles of a solid state lithium battery in accordance with an example of the present disclosure.

FIG. 11 shows the typical potential vs. capacity profiles at 0.1 C and 25° C. for the $1^{st}$, $10^{th}$, and $100^{th}$ cycles, respectively. Flat voltage plateaus representing the insertion/removal of lithium ions at the $LiFePO_4$ cathode are seen. The plateaus were maintained even after 100 cycles. The initial discharge capacity was 171.6 mAh $g^{-1}$, and the initial charge capacity was 170.4 mAh $g^{-1}$, which is close to the theoretical capacity. The capacity maintained at 156 mAh $g^{-1}$ after 100 cycles, with 90.9% retention compared to the first discharge capacity.

Figure 12:
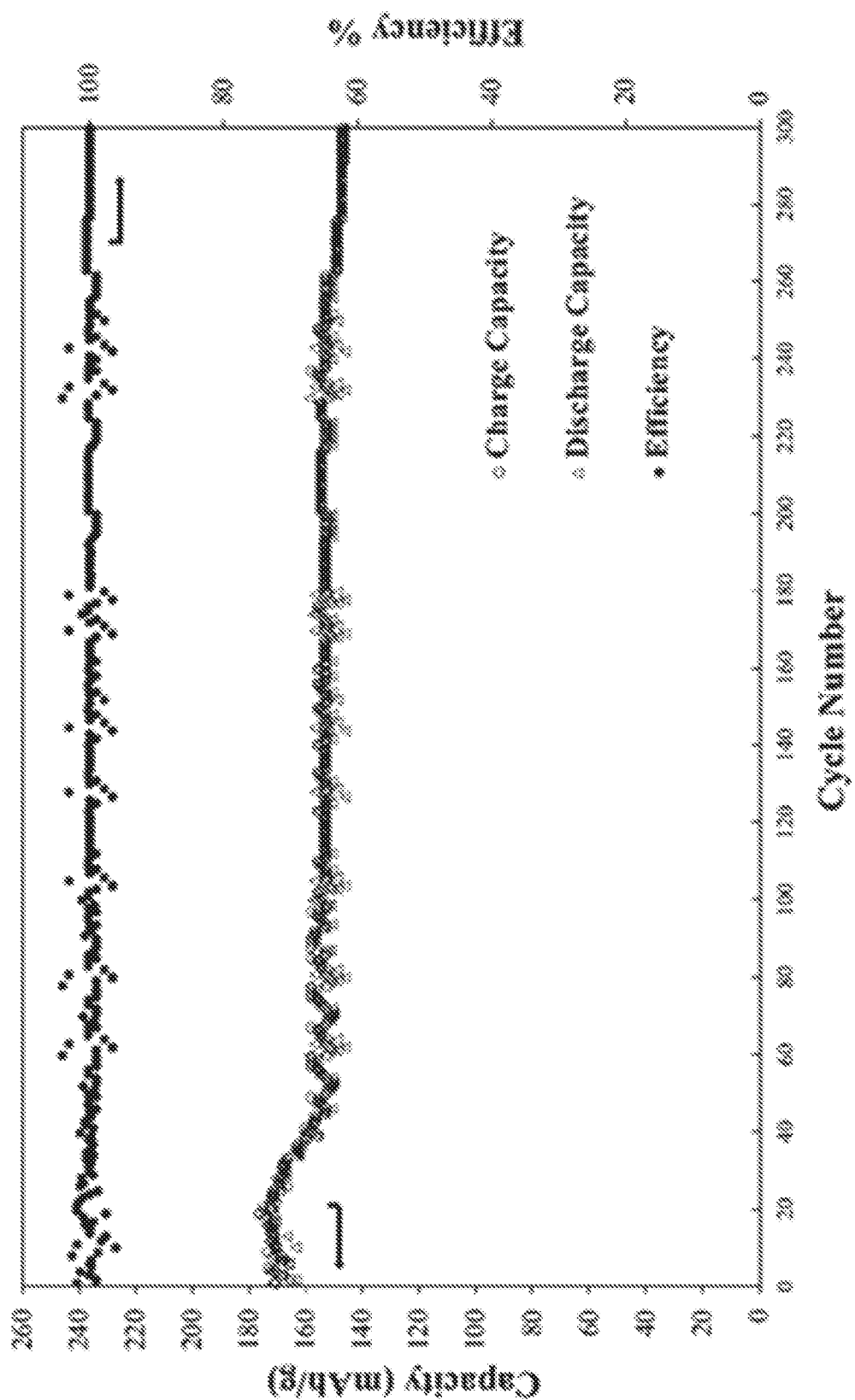
FIG. 12 is a graph of battery cycling performance tests for a solid state lithium battery in accordance with an example of the present disclosure.
Figure 13:
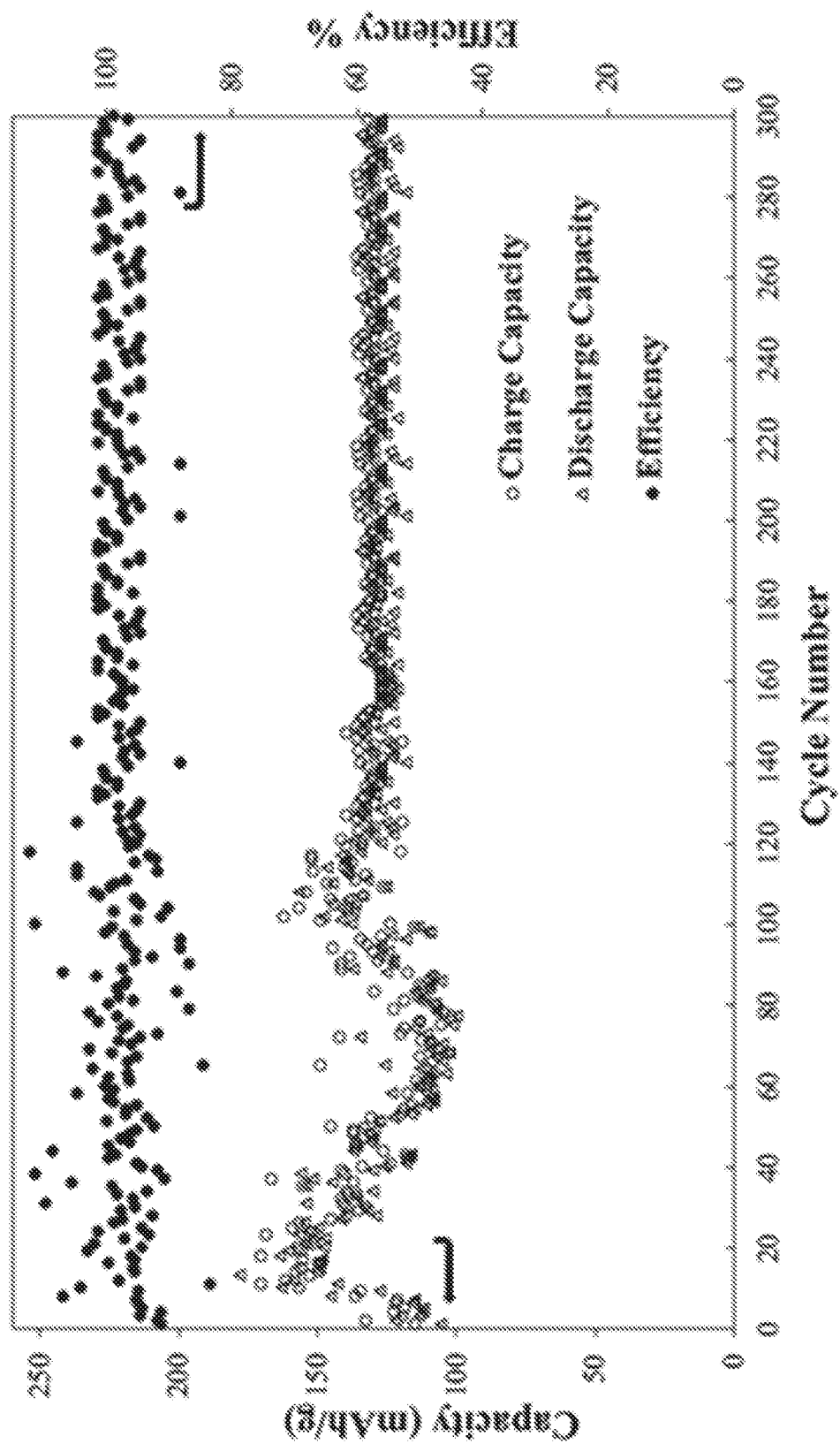
FIG. 13 is a graph of battery cycling performance tests for a solid state lithium battery in accordance with an example of the present disclosure.
Figure 14:
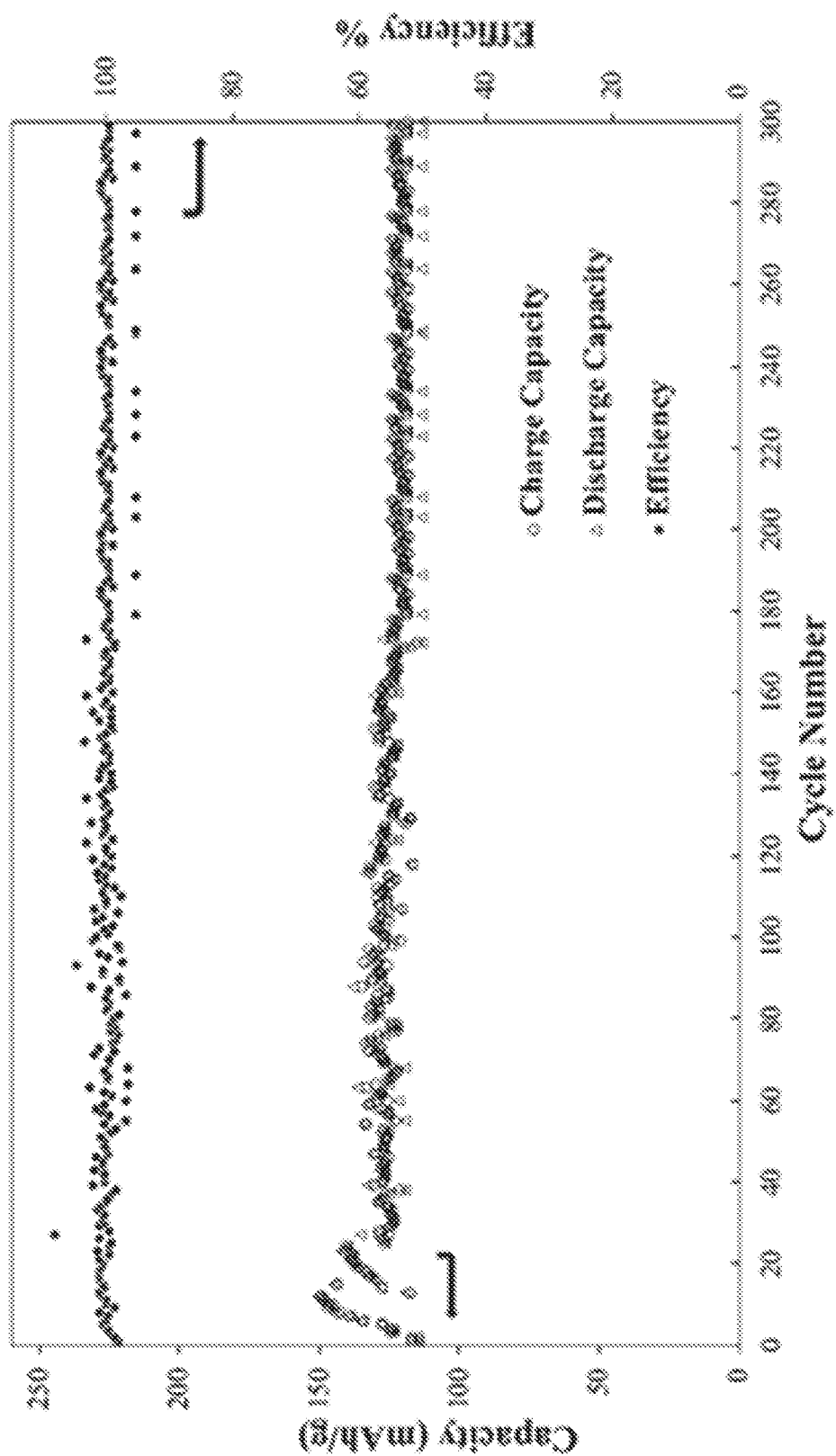
FIG. 14 is a graph of battery cycling performance tests for an all-solid state lithium battery in accordance with an example of the present disclosure.
Figure 15:
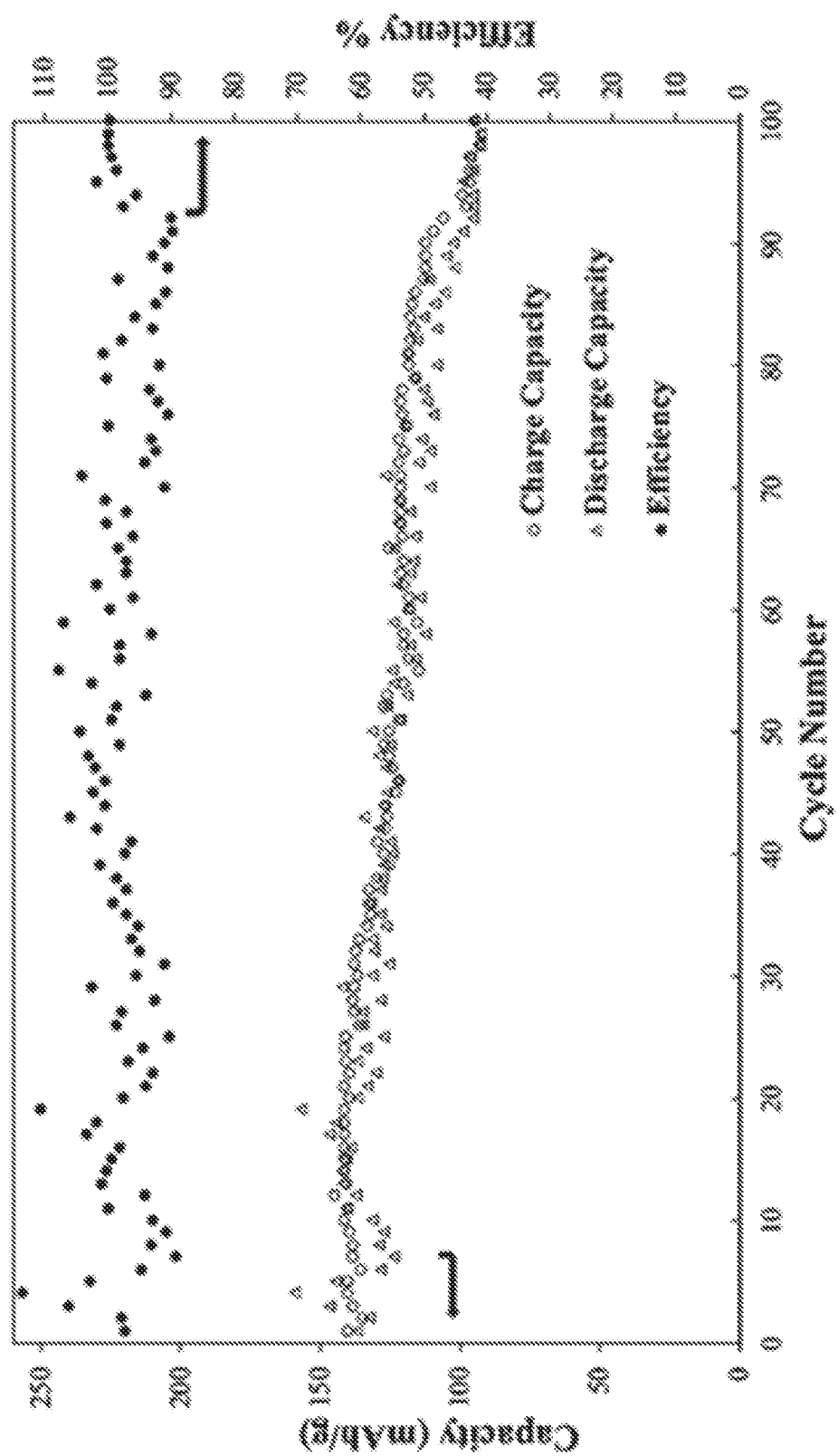
FIG. 15 is a graph of battery cycling performance tests for a solid state lithium battery in accordance with an example of the present disclosure.

The results for battery cycling performance tests of HNT-LFP/electrolyte-based LFP polymer batteries are presented in FIGS. 12-14, for 25° ° C. FIG. 12 shows the HNT-LFP/electrolyte-based LFP polymer battery performance at 0.1 and 25° C. FIG. 13 shows the HNT-LFP/electrolyte-based LFP polymer battery performance at 0.3 C and 25° C. FIG. 14 shows the HNT-LFP/electrolyte-based LFP polymer batter performance at 0.5 C and 25° C. The battery presented stable discharge capacities at room temperatures from 0.1 C to 0.5 C, with an averaged value of 152±3 mAh $g^{-1}$ at 0.1 C, 130±4 mAh $g^{-1}$ at 0.3 C, 120±3 mAh $g^{-1}$ at 0.5 C during the 300 discharge/charge cycles. Close to 100% efficiency for each cycle was achieved. High temperature testing at 60° C. and 1 C was also performed and an average capacity of 102±6 mAh $g^{-1}$ was maintained after 100 cycles, as shown in FIG. 15.

It should be noted that the LFP polymer batteries could not be cycled at room temperature when HNT/electrolyte was used in the battery, which indicates that the addition of LFP to the HNT/electrolytes improved battery cycling performance for the LFP polymer battery.

8. Thermal Stability

Figure 16:
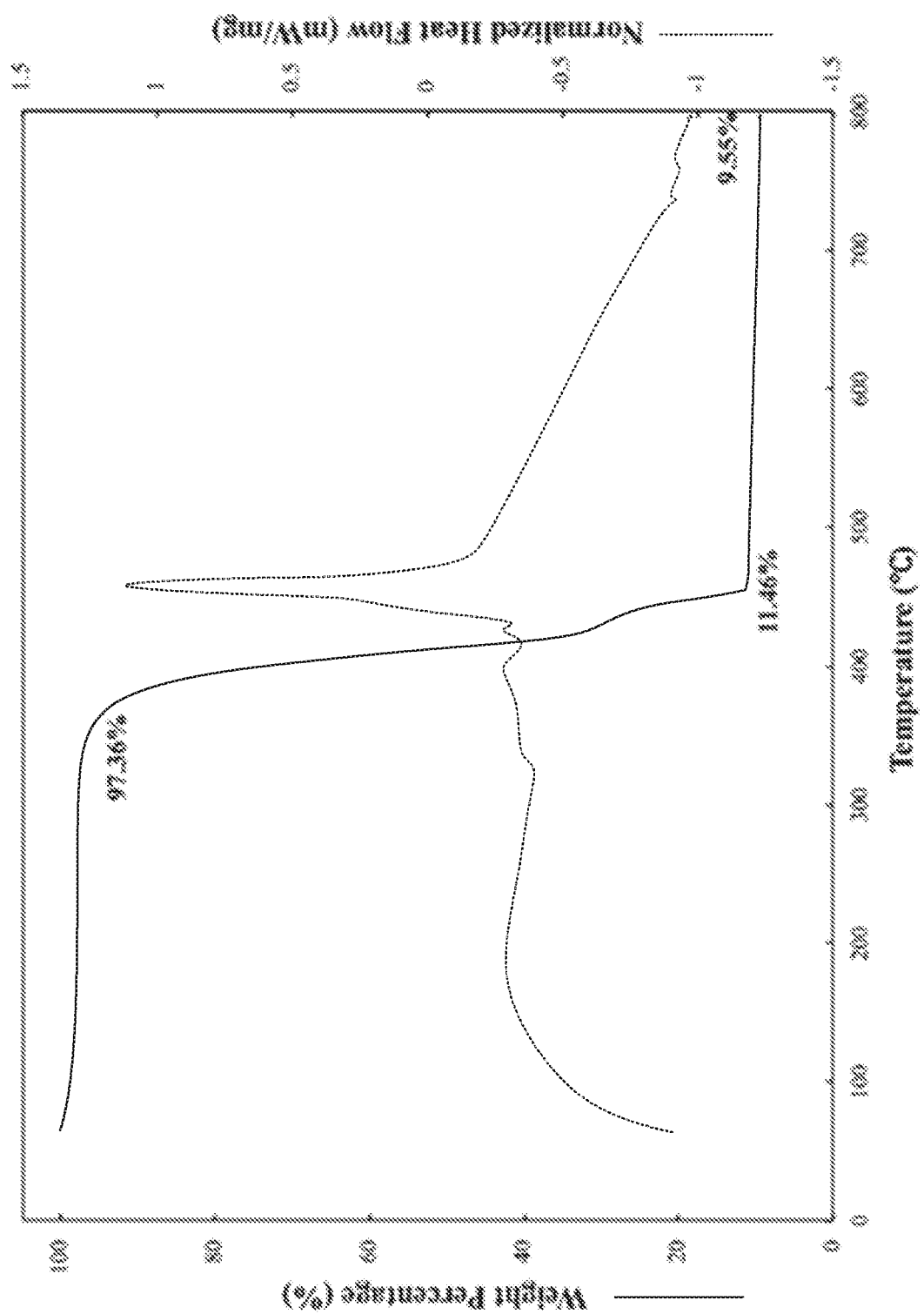
FIG. 16 is a graph of thermogravimetric analysis and differential scanning calorimetry results for a solid polymer electrolyte in accordance with an example of the present disclosure.

FIG. 16 shows the TGA and DSC results of HNT-LFP/electrolyte from 60° C. to 800° C. in an argon atmosphere at a heating rate of 10° C. $min^{-1}$. The weight loss of about 1.5% below 118° C. was due to the evaporation of water previously absorbed from the atmosphere. From 118 to 333° C., the 1.1% weight loss was attributed to the evaporation of the crystalline hydrate. The main degradation of the electrolytes from about 333 to 458° C. and the corresponding exothermic peak in the DSC curve at 458° C. were ascribed to the decomposition of PEO and LiTFSI. The residual for the HNT-LFP/electrolyte was 9.5%, which is higher than the 6% residue of PEO+LiTFSI solid polymer electrolyte reported in our previous study. Thus, with the addition of HNT and LFP, the HNT-LFP/electrolyte displayed even greater thermal stability.

9. Interfacial Compatibility Between Composite Solid Electrolytes and LFP Electrode In order to further investigate the interfacial compatibility of composite solid electrolytes and the electrodes on cycling performance, the EIS spectra of LFP polymer batteries with different composite solid electrolytes were analyzed.

Figure 17:
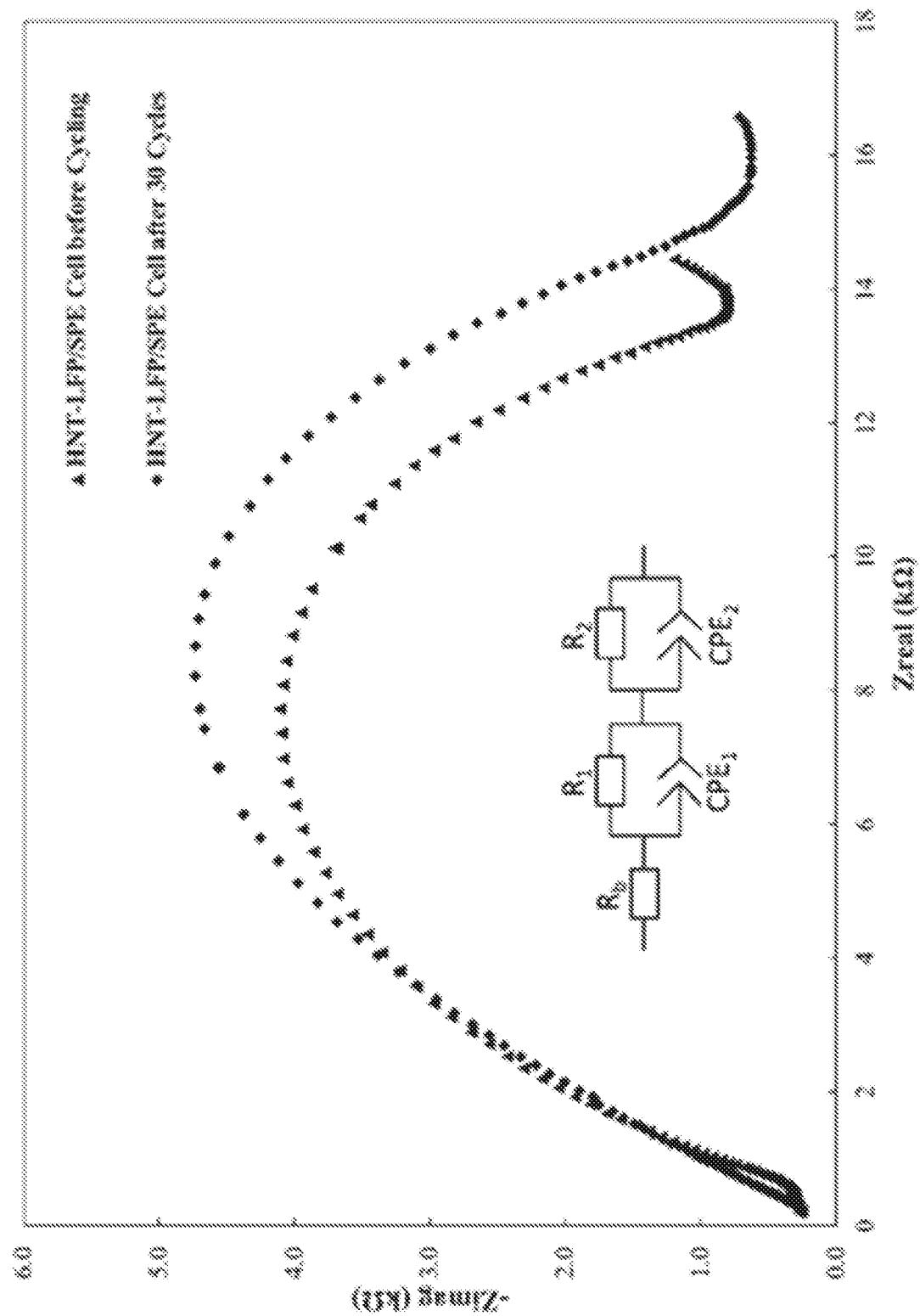
FIG. 17 is a graph of impedance spectra of a solid state lithium battery in accordance with an example of the present disclosure.

The impedance spectra of the LFP-HNT/electrolyte based LFP polymer battery before and after 30 charge-discharge cycles at 0.1 C and 25° C. were measured and the results are presented in FIG. 17 (EIS spectra of LFP-HNT/electrolyte-based cell before and after cycles; inset: equivalent circuit of the LFP-HNT/electrolyte-based cell). The intercept of the spectra with the real axis in the high-frequency area represents the bulk resistance ($R_{bulk}$) of the battery, while the semicircle in the middle frequency is attributed to the interfacial resistance of the charge transfer at the LFP/electrolyte interface ($R_1$) and the solid electrolyte interface resistance at the Li-electrolyte interface ($R_2$). As shown in FIG. 17, the bulk resistance increased slightly from 214Ω to 251Ω, indicating that the LFP-HNT/electrolyte can maintain a very stable ionic conductivity during cycling. For the interfacial resistance, the value was 13.8 kΩ before cycling and 15.1 kΩ after cycling, with an increase of only 10% after 30 cycles. The relatively stable interfacial resistance accounts for the capacity retention for repeated charging and discharging after 30 cycles, which corresponds well with the cycling performance data. See FIG. 12. Good interfacial properties are attributed mainly to 1) the addition of LFP, since LFP adds to the compatibility between the electrode and electrolyte, and 2) the addition of HNT, since HNT facilitates the charge transfer between the electrode and electrolyte.

Figure 18:
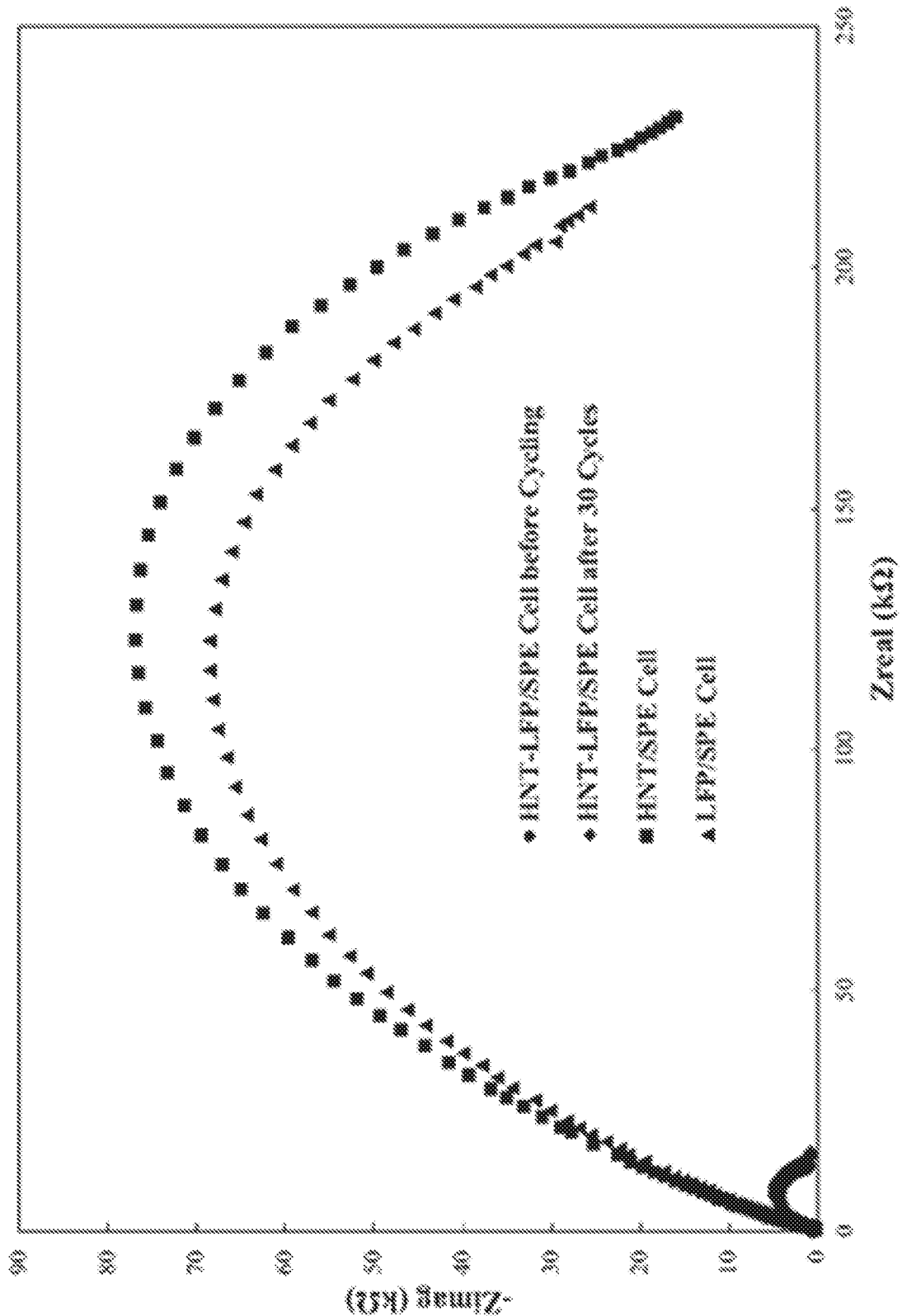
FIG. 18 is a graph of impedance spectra of solid state lithium batteries with different solid polymer electrolytes, in accordance with examples of the present disclosure.

FIG. 18 presents the comparison of EIS spectra of LFP cells using different composite solid electrolytes. It is evident that the interfacial resistances of the HNT/electrolyte-based cell and the LFP/electrolyte-based cell were significantly greater than those of the LFP-HNT/electrolyte-based cell for initial behavior and after cycling, which explains why the composite solid electrolytes without addition of LFP are not suitable for room temperature LFP polymer batteries.

10. Conclusions

The results from this research suggest that the comprehensive performance for the lithium iron phosphate battery was improved due to the use of a new composite solid electrolyte, HNT-LFP/electrolyte. It can be concluded from the data that the addition of both HNT and LFP account for the improved ionic conductivity and electrochemical stability of the new SPE. The addition of LFP also increased the compatibility between the electrode and electrolyte. The new composite solid electrolyte, HNT-LFP/electrolyte, can be easy to integrate into current commercial lithium iron phosphate battery production.

What is claimed is:

1. A solid state lithium battery cell, comprising:
   a composite solid electrolyte layer comprising:
      a solid polymer,
      a lithium salt distributed in the solid polymer, and
      lithium iron phosphate distributed in the solid polymer;
   an anode containing lithium in contact with a first surface of the composite solid electrolyte layer; and
   a cathode in contact with a second surface of the composite solid electrolyte layer, wherein the cathode comprises lithium iron phosphate and the anode consists of lithium metal such that the entire battery cell is an all-solid-state battery and further wherein at least one of:
      the cathode further comprises conductive carbon; and
      the composite solid electrolyte layer further comprises phyllosilicate nanoparticles distributed in the solid polymer.

2. The solid state lithium battery cell of claim 1, wherein an interfacial resistance of the cell is from 10 k$\Omega$ to 15 k$\Omega$.

3. The solid state lithium battery cell of claim 1, wherein the solid polymer comprises polyethylene oxide and the phyllosilicate nanoparticles are halloysite nanotubes.

4. The solid state lithium battery cell of claim 1, wherein the phyllosilicate nanoparticles are bilayer phyllosilicates.

5. The solid state lithium battery cell of claim 1, wherein the lithium iron phosphate is present in an amount from 0.5 wt % to 2 wt %.

6. The solid state lithium battery cell of claim 1, wherein the solid polymer comprises one or more of polyethylene oxide, polymethyl methacrylate, polycarbonate, polysiloxane, starch, sugar, fiber, polyvinyl alcohol, polyphosphazene and polystyrene.

7. The solid state lithium battery cell of claim 6, wherein a molar ratio of ethylene oxide units to lithium ions (EO:Li) in the composite solid electrolyte is from 8:1 to 25:1.

8. The solid state lithium battery cell of claim 1, wherein the composite solid electrolyte layer is formed as a thin film having a thickness from 1 μm to 300 μm.

9. The solid state lithium battery cell of claim 8, wherein the thickness is from 10 μm to 100 μm.

10. The solid state lithium battery cell of claim 1, wherein the composite solid electrolyte layer has a lithium ion conductivity of at least 104 S cm$^{-1}$ at 25° C.

11. The solid state lithium battery cell of claim 1, wherein the lithium salt is LiTFSI.

12. The solid state lithium battery cell of claim 1, wherein the phyllosilicate nanoparticles are in the form of nanotubes, nanoplatelets, or a combination thereof.

13. The solid state lithium battery cell of claim 1, wherein the phyllosilicate nanoparticles comprise an aluminum based phyllosilicate, a magnesium based phyllosilicate, or a combination thereof.

14. The solid state lithium battery cell of claim 1, wherein the phyllosilicate nanoparticles comprise one or more of kaolinite, halloysite, chrysotile, antigorite, talc, pyrophyllite, montmorillonite, chlorite, mica, sepiolite, and serpentine.

15. The solid state lithium battery cell of claim 1, wherein the phyllosilicate nanoparticles are bilayer phyllosilicates.

16. The solid state lithium battery cell of claim 15, wherein the bilayer phyllosilicate nanoparticles comprise one or more of halloysite, kaolinite, chrysotile, and antigorite.

17. The solid state lithium battery cell of claim 1, wherein the phyllosilicate nanoparticles are chemically modified with a lithium ion.

18. The solid state lithium battery cell of claim 1, wherein the phyllosilicate nanoparticles are functionalized by one or more of carbonate, ethylene oxide, and phosphazene.

19. The solid state lithium battery cell of claim 1, wherein the phyllosilicate nanoparticles are in the form of nanotubes having a liquid polymer electrolyte impregnated in an interior volume of the nanotubes.

20. The solid state lithium battery cell of claim 1, wherein the phyllosilicate nanoparticles are bilayer halloysite nanotubes.

21. The solid state lithium battery cell of claim 1, wherein the phyllosilicate nanoparticles are present in an amount from 1 wt % to 30 wt %.

22. A solid state lithium battery cell, comprising:
   a composite solid electrolyte layer comprising:
      a solid polymer comprising one or more of polyethylene oxide, polymethyl methacrylate, polycarbonate, polysiloxane, starch, sugar, fiber, polyvinyl alcohol, polyphosphazene and polystyrene,
      a lithium salt distributed in the solid polymer, and
      lithium iron phosphate distributed in the solid polymer;
   an anode containing lithium in contact with a first surface of the composite solid electrolyte layer; and
   a cathode in contact with a second surface of the composite solid electrolyte layer, wherein a molar ratio of ethylene oxide units to lithium ions (EO:Li) in the composite solid electrolyte is from 8:1 to 25:1.

23. The solid state lithium battery cell of claim 22, wherein the composite solid electrolyte layer further comprises phyllosilicate nanoparticles distributed in the solid polymer.

24. A solid state lithium battery cell, comprising:
   a composite solid electrolyte layer comprising:
      a solid polymer,
      an LiTFSI lithium salt distributed in the solid polymer, and
      lithium iron phosphate distributed in the solid polymer;
   an anode containing lithium in contact with a first surface of the composite solid electrolyte layer; and a cathode in contact with a second surface of the composite solid electrolyte layer.

25. The solid state lithium battery cell of claim 24, wherein the composite solid electrolyte layer further comprises phyllosilicate nanoparticles distributed in the solid polymer.

* * * * *